(12) United States Patent
Goldman

(10) Patent No.: US 11,305,483 B2
(45) Date of Patent: Apr. 19, 2022

(54) TECHNIQUES FOR APPLICATION OF LIGHT IN ADDITIVE FABRICATION AND RELATED SYSTEMS AND METHODS

(71) Applicant: Formlabs, Inc., Somerville, MA (US)

(72) Inventor: Andrew M. Goldman, Stow, MA (US)

(73) Assignee: Formlabs, Inc., Somerville, MA (US)

( * ) Notice: Subject to any disclaimer, the term of this patent is extended or adjusted under 35 U.S.C. 154(b) by 122 days.

(21) Appl. No.: 16/163,403

(22) Filed: Oct. 17, 2018

(65) Prior Publication Data

US 2019/0152135 A1    May 23, 2019

Related U.S. Application Data

(60) Provisional application No. 62/575,250, filed on Oct. 20, 2017, provisional application No. 62/679,167, filed on Jun. 1, 2018.

(51) Int. Cl.
*B29C 64/135* (2017.01)
*B29C 64/245* (2017.01)
(Continued)

(52) U.S. Cl.
CPC .......... *B29C 64/135* (2017.08); *B29C 64/245* (2017.08); *B29C 64/268* (2017.08);
(Continued)

(58) Field of Classification Search
CPC .......................... B29C 64/135; B29C 64/245
See application file for complete search history.

(56) References Cited

U.S. PATENT DOCUMENTS 5,004,311 A    4/1991 Peppers
5,391,072 A    2/1995 Lawton et al.
(Continued)

FOREIGN PATENT DOCUMENTS

CN          1910206 A      2/2007
WO   WO 2005/116089 A1   12/2005
(Continued)

OTHER PUBLICATIONS

International Search and Written Opinion for International Application No. PCT/US2019/034807 dated Sep. 30, 2019.
(Continued)

*Primary Examiner* — Alison L Hindenlang
*Assistant Examiner* — Asha A Thomas
(74) *Attorney, Agent, or Firm* — Wolf, Greenfield & Sacks, P.C.

(57) ABSTRACT

Techniques for illuminating a photocurable material within a build area of an additive fabrication device are described. According to some aspects, a light source is provided that can be moved alongside a build area, allowing light to be directed to any desired position within the build area by moving the light source. This configuration may also allow the distance from the light source to the build area to be substantially the same for each position across the build area by moving the light source whilst maintaining a fixed distance from the light source to the build volume. The described approach may allow for fabrication of larger parts in an additive fabrication device by expanding or eliminating the practical upper limit on the area of the build volume that can be imposed by use of a laser light source in such a device.

18 Claims, 20 Drawing Sheets

(51) Int. Cl.
  *B29C 64/268* (2017.01)
  *B29C 64/393* (2017.01)
  *B29C 64/218* (2017.01)
  *B33Y 50/02* (2015.01)
  *B33Y 10/00* (2015.01)
  *B33Y 30/00* (2015.01)
  *B33Y 40/00* (2020.01)

(52) U.S. Cl.
  CPC .......... *B29C 64/393* (2017.08); *B29C 64/218* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 8,142,179 B2 | 3/2012 | Kihara et al. | |
| 8,758,663 B2 | 6/2014 | Elsey | |
| 9,079,355 B2 | 7/2015 | El-Siblani et al. | |
| 9,205,601 B2 | 12/2015 | DeSimone et al. | |
| 9,375,881 B2 | 6/2016 | Elsey | |
| 9,802,361 B2 | 10/2017 | Elsey | |
| 2004/0135159 A1* | 7/2004 | Siegel | B41F 23/0409 257/88 |
| 2007/0224768 A1 | 9/2007 | Chaplick et al. | |
| 2009/0130449 A1 | 5/2009 | El-Siblani | |
| 2009/0196946 A1 | 8/2009 | Kihara et al. | |
| 2010/0227068 A1* | 9/2010 | Boot | B29C 64/135 427/346 |
| 2012/0106150 A1* | 5/2012 | Vaes | B29C 64/129 362/236 |
| 2014/0070463 A1 | 3/2014 | Boot et al. | |
| 2015/0001763 A1 | 1/2015 | Elsey | |
| 2016/0046080 A1 | 2/2016 | Thomas et al. | |
| 2016/0067827 A1 | 3/2016 | Zediker | |
| 2016/0107380 A1 | 4/2016 | Smoot et al. | |
| 2017/0197363 A1 | 7/2017 | Frantzdale | |
| 2017/0225393 A1 | 8/2017 | Shkolnik | |
| 2017/0246796 A1 | 8/2017 | Bauer et al. | |
| 2017/0246797 A1 | 8/2017 | Lambrecht et al. | |
| 2018/0104895 A1 | 4/2018 | Slaczka et al. | |
| 2018/0126644 A1 | 5/2018 | Slaczka et al. | |
| 2019/0210289 A1 | 7/2019 | Frantzdale et al. | |
| 2019/0283332 A1 | 9/2019 | Brown et al. | |
| 2019/0366636 A1 | 12/2019 | Megretski et al. | |

FOREIGN PATENT DOCUMENTS

| | | |
|---|---|---|
| WO | WO 2013/170311 A1 | 11/2013 |
| WO | WO 2016/148341 A1 | 9/2016 |

OTHER PUBLICATIONS

International Preliminary Report on Patentability for International Application No. PCT/US18/56288 dated Apr. 30, 2020.
PCT/US18/056288, International Preliminary Report on Patentability.
PCT/US2019/034807, Sep. 30, 2019, International Search Report and Written Opinion.
International Search and Written Opinion for International Application No. PCT/US18/56288 dated Dec. 11, 2018.
Invitation to Pay Additional Fees for International Application No. PCT/US2019/034807 dated Jul. 18, 2019.
Baker, Membrane Technology and Application. 2nd Edition. John Wiley & Sons, Ltd. The Atrium, Southern Gate, Chichester, West Sussex PO19 8SQ, England. 2004. 545 pages. ISBN 0-470-85445-6.
Carvalho, Wrinkling of thin sheets under tension. Thesis to obtain the Master of Science Degree in Aerospace Engineering. Nov. 2015. 103 pages.
U.S. Appl. No. 16/427,936, filed May 31, 2019, Megretski et al.
PCT/US18/56288, Dec. 11, 2018, International Search Report and Written Opinion.
PCT/US2019/034807, Jul. 18, 2019, Invitation to Pay Additional Fees.
PCT/US2019/034807, Dec. 10, 2020, International Preliminary Report on Patentability.
International Preliminary Report on Patentability for International Application No. PCT/US2019/034807, dated Dec. 10, 2020.
Extended European Search Report dated Jun. 29, 2021 in connection with European Application No. 18869301.4.

\* cited by examiner

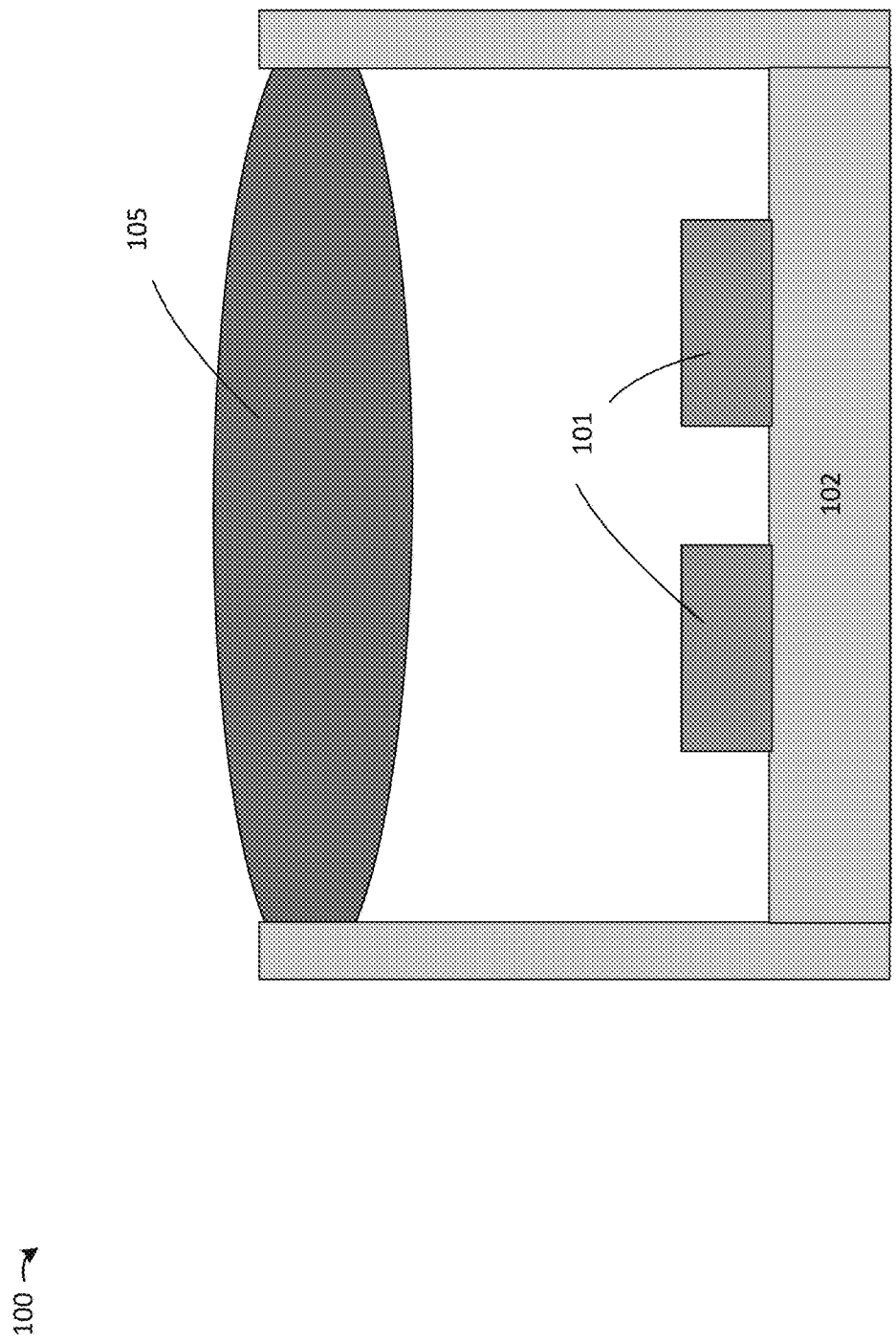

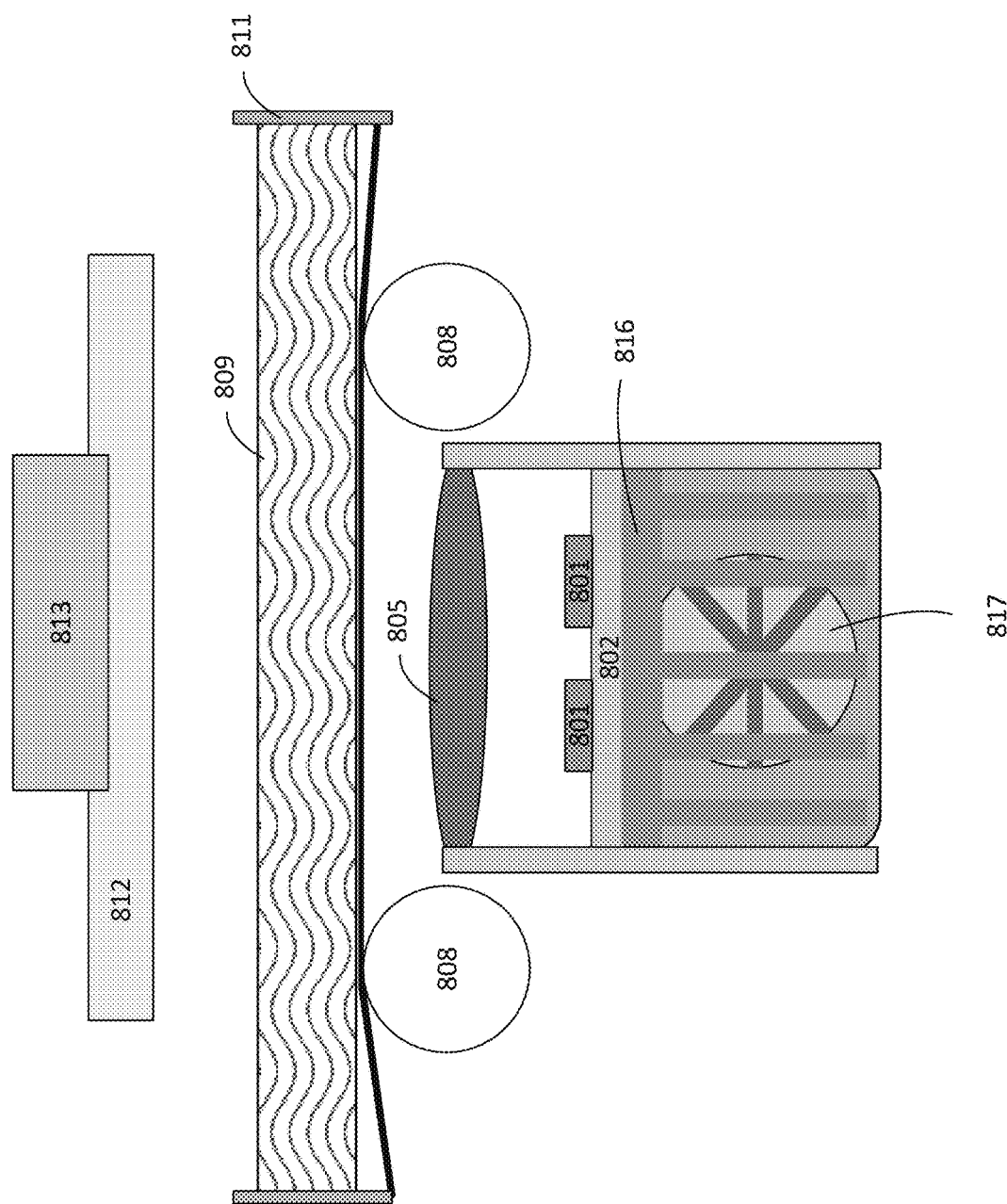

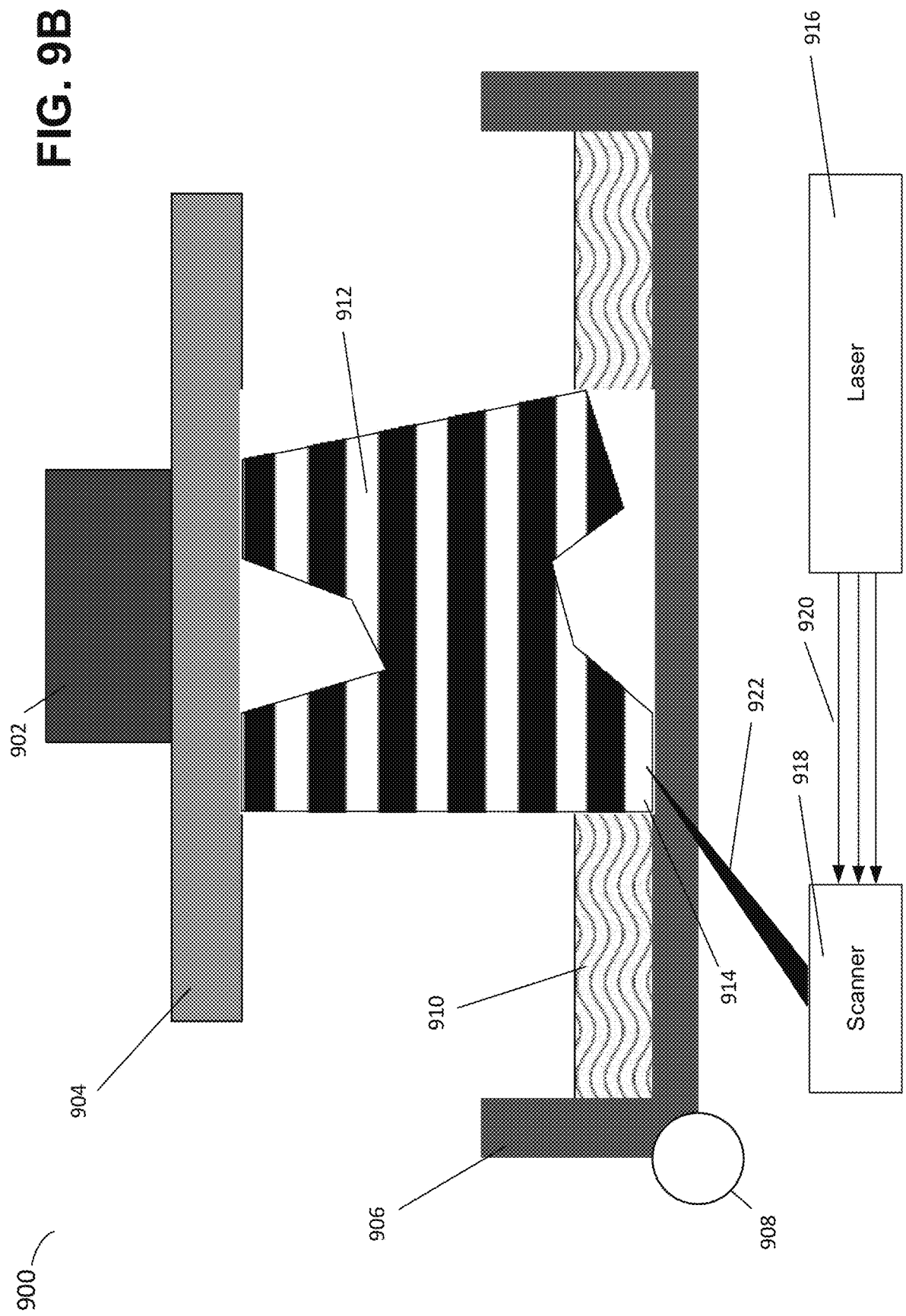

TECHNIQUES FOR APPLICATION OF LIGHT IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 62/575,250, filed Oct. 20, 2017, titled "Techniques For Application Of Light In Additive Fabrication And Related Systems And Methods," and claims the benefit under 35 U.S.C. § 119(e) of U.S. Provisional Patent Application No. 62/679,167, filed Jun. 1, 2018, titled "Improved Stereolithography Techniques And Related Systems And Methods," each of which is hereby incorporated by reference in its entirety.

FIELD OF INVENTION

The present invention relates generally to systems and methods for directing a light source within an additive fabrication (e.g., 3-dimensional printing) device.

BACKGROUND

Additive fabrication, e.g., 3-dimensional (3D) printing, provides techniques for fabricating parts, typically by causing portions of a building material to solidify at specific locations. Additive fabrication techniques may include stereolithography, selective or fused deposition modeling, direct composite manufacturing, laminated part manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired part. Typically each layer is formed such that it adheres to either a previously formed layer or a substrate upon which the part is built.

In one approach to additive fabrication, known as stereolithography, solid parts are created by successively forming thin layers of a liquid photopolymer (e.g., a curable polymer resin), typically first onto a substrate and then one on top of another. Exposure to actinic radiation cures a thin layer of liquid photopolymer, which causes it to harden and adhere to previously cured layers or the bottom surface of the build platform.

SUMMARY

According to some aspects, an additive fabrication device configured to form layers of solid material on a build platform is provided, each layer of material being formed so as to contact a container in addition to the surface of the build platform and/or a previously formed layer of material, the additive fabrication device comprising a container having an interior bottom surface extending in a first direction and a second direction, perpendicular to the first direction, and a movable stage configured to move in the first direction, the movable stage being arranged beneath the container and comprising a plurality of light sources offset from one another along the second direction and operable to direct light through the interior bottom surface of the container.

According to some aspects a method of additive fabrication is provided, the method comprising moving, within an additive fabrication device, a movable stage beneath a container having an interior bottom surface extending in a first direction and a second direction, perpendicular to the first direction, the container holding a liquid photopolymer, and the movable stage configured to move in the first direction, the movable stage being arranged beneath the container and comprising a plurality of light sources offset from one another along the second direction and operable to direct light through the interior bottom surface of the container, and directing actinic radiation from at least some of the plurality of light sources through the interior bottom surface of the container to the liquid photopolymer held by the container, thereby forming a layer of solid material that contacts the interior bottom surface in addition to the surface of a build platform and/or to a previously formed layer of material.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. For purposes of clarity, not every component may be labeled in every drawing. In the drawings:

FIG. 1B depicts a cross-sectional view of an illustrative arrangement of an LED array and an imaging lens, according to some embodiments;

FIG. 8 illustrates a light source and associated heat sink and cooling fan, according to some embodiments; and FIG. 9A-B illustrate system components and operation of an illustrative additive fabrication device;

DETAILED DESCRIPTION

Systems and methods for generating and directing a light source in an additive fabrication device are provided. As discussed above, in additive fabrication a plurality of layers of material may be formed on a build platform. In some cases, one or more of the layers may be formed so as to be in contact with a surface other than another layer or the build platform.

Figure 9A:
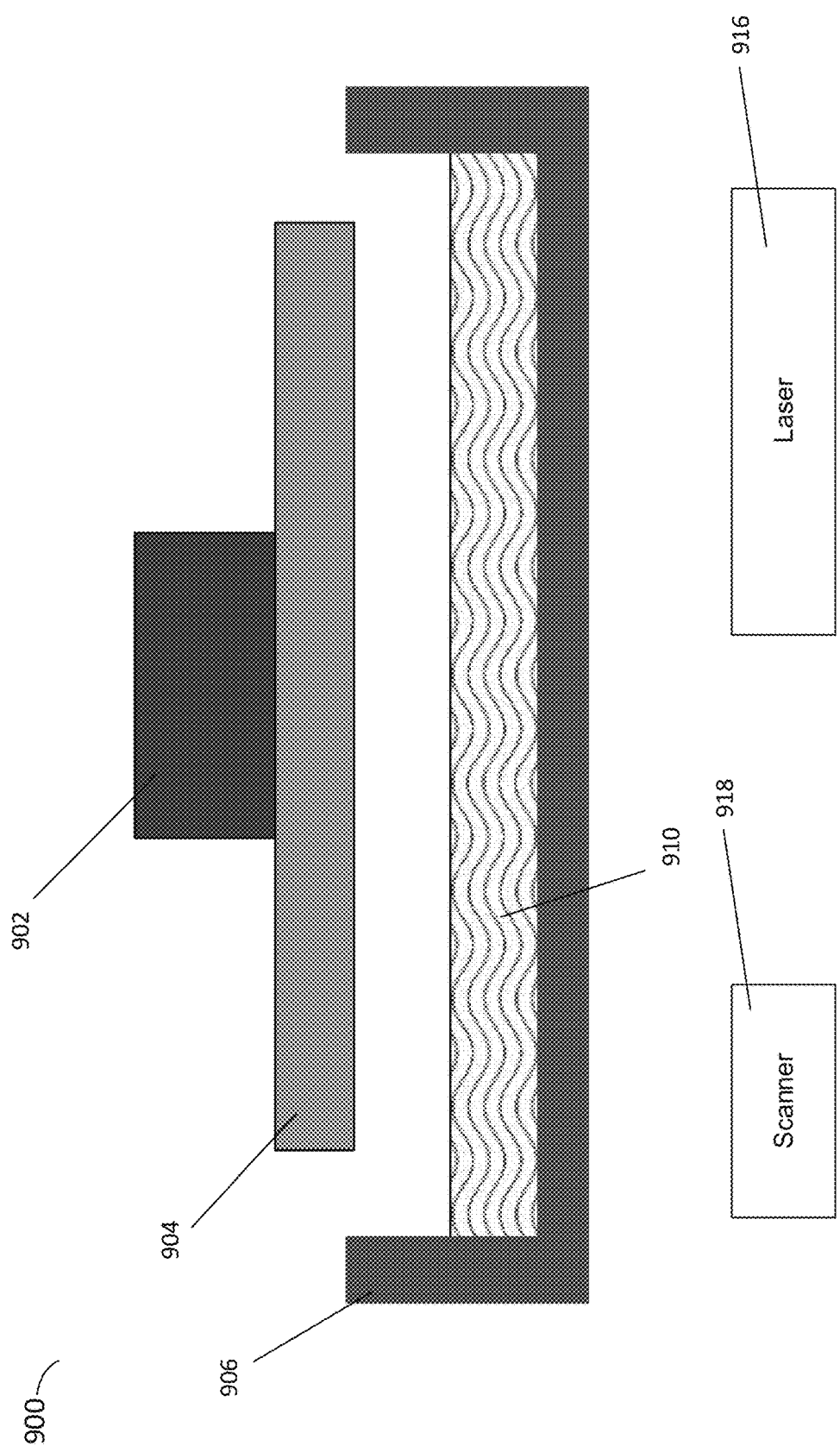

To illustrate one exemplary additive fabrication technique, a so-called inverse stereolithographic additive fabrication device (or "printer") is depicted in FIGS. 9A-B. Illustrative stereolithographic printer 900 is configured to form a part in a downward-facing direction on a build platform 904 such that layers of the part are formed in contact with a surface of container 906 in addition to a previously cured layer or the build platform. In the example of FIGS. 9A-B, stereolithographic printer 900 comprises build platform 904, container 906, liquid photopolymer 910, a laser 916, and a scanner system 918. The build platform 904 opposes the floor of container 906, which contains liquid photopolymer 910. In the example of FIGS. 9A-B, stereolithographic printer 900 is configured to form a part, such as the part 912 illustrated in FIG. 9B, in a downward facing direction on the build platform 904 such that layers of the part are formed in contact with a surface of container 906 in addition to a previously cured layer or the build platform 904.

As shown in FIG. 9B, a part 912 may be formed layer wise within a build volume of the stereolithographic printer 900, with an initial layer being attached to the build platform 904. As referred to herein, a build volume is a volumetric region in an additive fabrication device in which solid material can be produced by the device by solidifying a liquid or otherwise. The container's floor may be transparent to actinic radiation, which can be targeted at portions of a build area. As referred to herein, a build area refers to a two-dimensional cross-section of a build volume. In the example of FIG. 9B, for example, a build area may include some or all of the surface of container 906. For instance, the build area may be defined by those portions of the container that the light 922 may be directed toward. As may be appreciated, the techniques disclosed herein may be suited for use in any additive fabrication techniques in which parts are formed from a photocurable material, and are not limited to the illustrative inverted stereolithography approach illustrated in FIGS. 9A-9B. For instance, the techniques may also be applied in so-called right-side up approaches to stereolithography.

In the example of FIGS. 9A-B, directing light to the build area exposes liquid photopolymer 910 to actinic radiation and cures a thin layer of the liquid photopolymer, which causes it to harden. In FIG. 9B, the most recently cured layer is referenced as layer 914. When the layer 914 is formed, it is at least partially in contact with the surface of the container 906. The other side of layer 914 bonds with a previously cured layer in addition to the transparent floor of the container 906. In order to form additional layers of the part subsequent to the formation of layer 914, any bonding that occurs between the transparent floor of the container 906 and the layer 914 must be broken. For example, one or more portions of the surface (or the entire surface) of layer 914 may adhere to the container 906 such that the adhesion must be removed prior to formation of a subsequent layer.

In order to cure the layer 914 by exposure to actinic radiation, the stereolithographic printer 900 may use the laser 916 and scanner system 918 to produce a laser beam 922. The laser 916 can produce laser light rays 920 which are directed to the scanner system 918. The scanner system 918 directs a laser beam 922 to a location of the build volume. The laser beam 922 may have a spot size within the build volume based on the cross-sectional size of the laser beam at the point where the beam is incident on the build volume. Exposure of a portion of the liquid photopolymer 910 to the laser cures the portion of the liquid photopolymer. For example, when an entire portion of the build volume of layer 914 has been exposed to the laser beam 922, layer 914 of the part 912 may be formed. The scanner system 918 may include any number and type of optical components, such as multiple galvanometers and/or lenses that may be operated to direct the light emitted by laser 916.

In conventional stereolithography systems, multiple problems may arise due to limitations of the light source used in the fabrication system. One challenge with a laser light source is that a laser has a fixed spot size when incident upon the liquid photopolymer. As such, the spot size of the laser when directed to a given position within the build volume is fixed, no matter the size and shape of the layer to be formed. Additionally, it may take time for a laser beam to scan an area defining a layer of the part. Thus, the fixed spot size and time required for scanning limit the speed at which the laser can be directed to form solid material, and hence the speed at which the fabrication process can be completed.

Another problem that may arise in additive fabrication systems that use a laser light source is that the laser beam must be directed to various positions within the build volume, which are generally positioned at different distances from the laser source. Thus, the optical path length from the laser source to the location at which liquid photopolymer is to be cured will vary across the build volume. This may cause laser beams and their associated optics to produce a less well-defined (e.g. more diffuse) spot of light at greater optical path lengths, and/or may also complicate fabrication due to the light being incident on the build volume at a range of different angles, thereby creating differently shaped spots of light. These issues may be exacerbated for longer path lengths and consequently, directing the laser beam to exterior regions or regions far from the light source of the build volume (e.g., those near the sides of container 906) may result in solid material being formed in those exterior regions in a less precise manner (e.g., due to the spot of light being less distinct).

In many additive fabrication devices, this limitation of a laser source places a practical upper limit on the size of the build area for laser-based systems. Some conventional systems alternately employ a digital light processing (DLP) source as the light source in an additive fabrication device, which can produce light that has the same optical path length to all points in the build volume and can expose a larger portion (e.g., all) of a build area to actinic radiation simultaneously. This can reduce overall build time, however DLP light sources contain a fixed array of light sources such that their light is directed only to fixed locations within the build volume, such that there may be locations in the build volume to which light cannot be directly applied or cannot be applied with desired accuracy. Furthermore, as the build volume increases, the accuracy of the DLP light source may decrease as the light must travel a longer distance and may diverge over the longer distance.

The inventors have recognized and appreciated that a light source that can be moved across the build area would mitigate the above-described issues by allowing light to be directed to any desired position within the build area by moving the light source. This configuration may also allow the distance from the light source to the build volume (the optical path length) to be substantially the same for each position across the build area by moving the light source whilst maintaining a fixed distance from the light source to the build volume. This configuration may allow for fabrication of larger parts in an additive fabrication device by eliminating the practical upper limit on the area of the build volume that can be imposed by use of a laser light source, as discussed above.

While the above-described techniques for application of light may be suited for use in systems in which the liquid photopolymer is held in a container with a rigid bottom surface, additional problems may arise where the container includes a flexible bottom surface, such as a film. In such systems, layers of a part being fabricated may be distorted as a result of distortions in the flexible surface. For example, in system 900, the bottom surface of the container 906 may be formed from (or may comprise) a film that could be distorted as a result of various forces, such as the platform 904 applying a downward force into the liquid (e.g., by pushing part 912 into the container) and/or by the weight of the liquid photopolymer causing the film to sag. Such a distortion in the surface of the container 906 may result in portions of the layer 920 being formed thicker or thinner than desired, since there may no longer be flat, parallel surfaces exhibited between the part 912 and the areas of the container 906 on to which solid material is formed.

The inventors have recognized and appreciated that a mechanism to counteract distortions in the surface of the container 906 may thereby reduce distortions in a fabricated part. In particular, leveling elements such as rollers may be moved laterally across the build area whilst providing an upward force upon the flexible surface, thereby producing a sufficiently flat surface for fabrication to proceed. Furthermore, the inventors have recognized and appreciated that an additive fabrication device may be configured to include a moveable stage on which both the above-described leveling element(s) and one or more light sources are disposed. Accordingly, the resulting moveable stage may provide a light source that can be moved across the build area in concert with one or more leveling elements that apply a force to a flexible portion of the container.

According to some embodiments, a moveable stage may comprise one or more arrays of light sources, such as arrays of light emitting diodes (LEDs). In some implementations, the size of an area of light within the build volume illuminated by a light source can be adjusted by (1) including light sources producing beams of various different sizes (e.g., arrays each producing beams of a different size) within the moveable stage and activating selected light sources to produce a desired beam size, and/or (2) by moving one or more of the light sources towards or away from the build volume. A variable illumination area may decrease fabrication times by enabling an additive fabrication device to utilize a larger spot size to fill in larger areas and a smaller spot size to fill in smaller areas when forming solid material. In some embodiments, each of the light sources may produce beams of the same sizes and a desired beam area may be produced by activating one or more individual beams.

Following below are more detailed descriptions of various concepts related to, and embodiments of, directing a source of light in additive fabrication and associated methods. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although the embodiments herein are primarily disclosed with respect to stereolithography systems, the techniques described herein may be equally applicable to other systems that produce solid material through application of actinic radiation. In some embodiments, structures fabricated via one or more additive fabrication techniques as described herein may be formed from, or may comprise, a plurality of layers. For example, layer-based additive fabrication techniques may fabricate a part by forming a series of layers, which may be detectable through observation of the part, and such layers may be any size, including any thickness between 10 microns and 500 microns. In some use cases, a layer-based additive fabrication technique may fabricate a part that includes layers of different thicknesses.

Figure 1A:
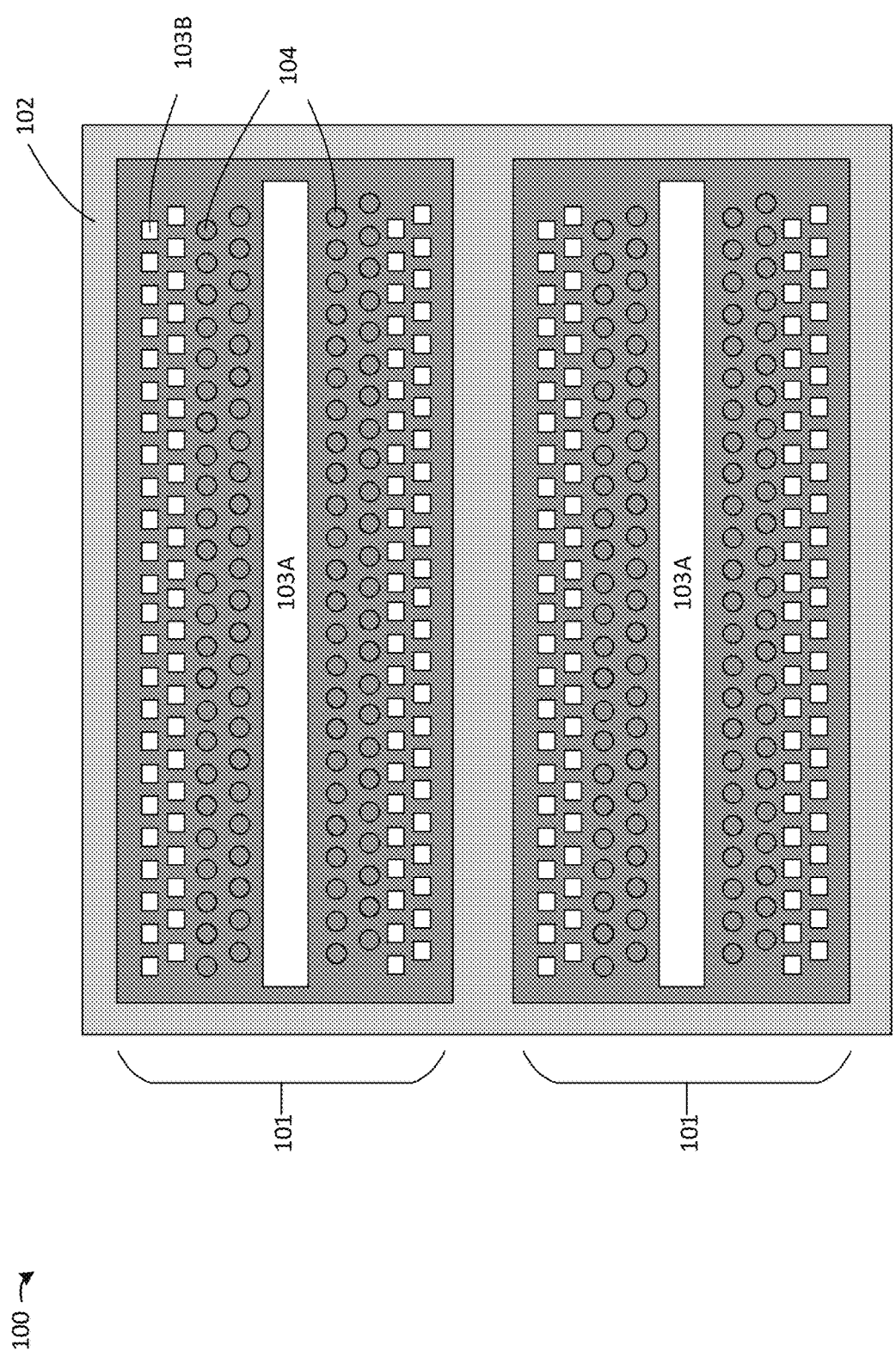
FIG. 1A depicts illustrative LED arrays, according to some embodiments.

FIG. 1A illustrates a light source 100 suitable for illumination within a stereolithographic additive fabrication device, according to some embodiments. In the example of FIG. 1A, light source 100 includes two light-emitting diode ("LED") arrays 101 which each comprise electrodes 103A and 103B and multiple rows of the LED emitters 104. In the illustrated configuration, four rows of LEDs are staggered or offset with respect to neighboring rows in each of the two LED arrays, as shown in FIG. 1A, which may improve reliability and resolution of an additive fabrication device into which the device 100 is installed. In the example of FIG. 1A, the electrodes 103A may be, for instance, a common cathode and the electrodes 103B may be anodes each coupled to a respective LED.

For example, the spacing of LEDs, and thus the ultimate resolution of a print, may be restricted by how many LEDs can fit into a single row. In some embodiments, such restrictions may be addressed by placing LEDs in parallel rows, staggered such that an area of the resin that is not illuminated by a first row of LEDs may be illuminated by one or more staggered rows. LED arrays, which may consist of such staggered rows, are then attached to a frame 102. According to some embodiments, the frame 102 may be coupled to, or may form part of, a moveable stage as discussed above.

As may be understood, the construction of LED arrays is not limited to any specific geometries or dimensions. LED arrays may be configured into any shape or size. As may be appreciated, certain configurations may be more advantageous for certain desired parameters such as speed, or simplicity while alternative configurations may be more advantageous for parameters such as cost or flexibility. For example in an arrangement prioritizing speed of printing and valuing simplicity, it may be advantageous to include an LED array the size of the full print area in order to reduce motion and allow the full printable area to be illuminated at once. In an arrangement prioritizing flexibility and cost, it may be more advantageous to include one or more smaller LED arrays in order to reduce the cost and add flexibility for suiting different printing needs such as adjusting the resolution for different applications.

In some embodiments, one or more arrays of LED emitters 104 may be collectively connected to a common cathode 103. Some embodiments may include an imaging lens 105, as shown in FIG. 1B, which may be suspended over some or all of the emitters in an array, and may be suspended over some or all of the arrays in the device. In some embodiments, various different numbers of cathodes 103 and imaging lenses 105 and LED emitters 104 may be employed, as well as different arrangements of LED emitters 104. Irrespective of how these elements are arranged, for ease of explanation, herein, movement of LED arrays 101 will refer to the collective movement of LED emitters 104, cathode 103, imaging lens 105, and frame 102. As discussed above, such movement may be achieved by mechanically coupling these elements to a moveable stage such that the elements move in concert with one another by moving the moveable stage. These components, however, may also be moved individually or collectively in any combination as the invention is not limited in this respect.

In some embodiments, LED arrays, such as those depicted in FIGS. 1A-1B, may provide comparable fabrication accuracy to that of a laser light source. As referred to herein, "accuracy" of a fabricated part may refer to a measure of similarity between a fabricated part and a three-dimensional model from which instructions to fabricate the part were generated. Since a three-dimensional model is not a physical object, it can exhibit details at any scale, whilst a fabricated object may have practical lower bounds on the sizes of various features that can be formed. As such, additive fabrication devices may not generally produce parts having complete accuracy compared with respective three-dimensional models from which instructions to fabricate a part were generated. Nonetheless, various additive fabrication devices and techniques may produce parts with varying degrees of accuracy, and references to improving accuracy herein may denote that a described technique(s) enables a closer replication of the part with respect to the three-dimensional model from which instructions to fabricate the part were generated than would otherwise be produced in the absence of the technique(s). Note that the described techniques may improve accuracy for some, but not necessarily all, parts.

Figure 2:
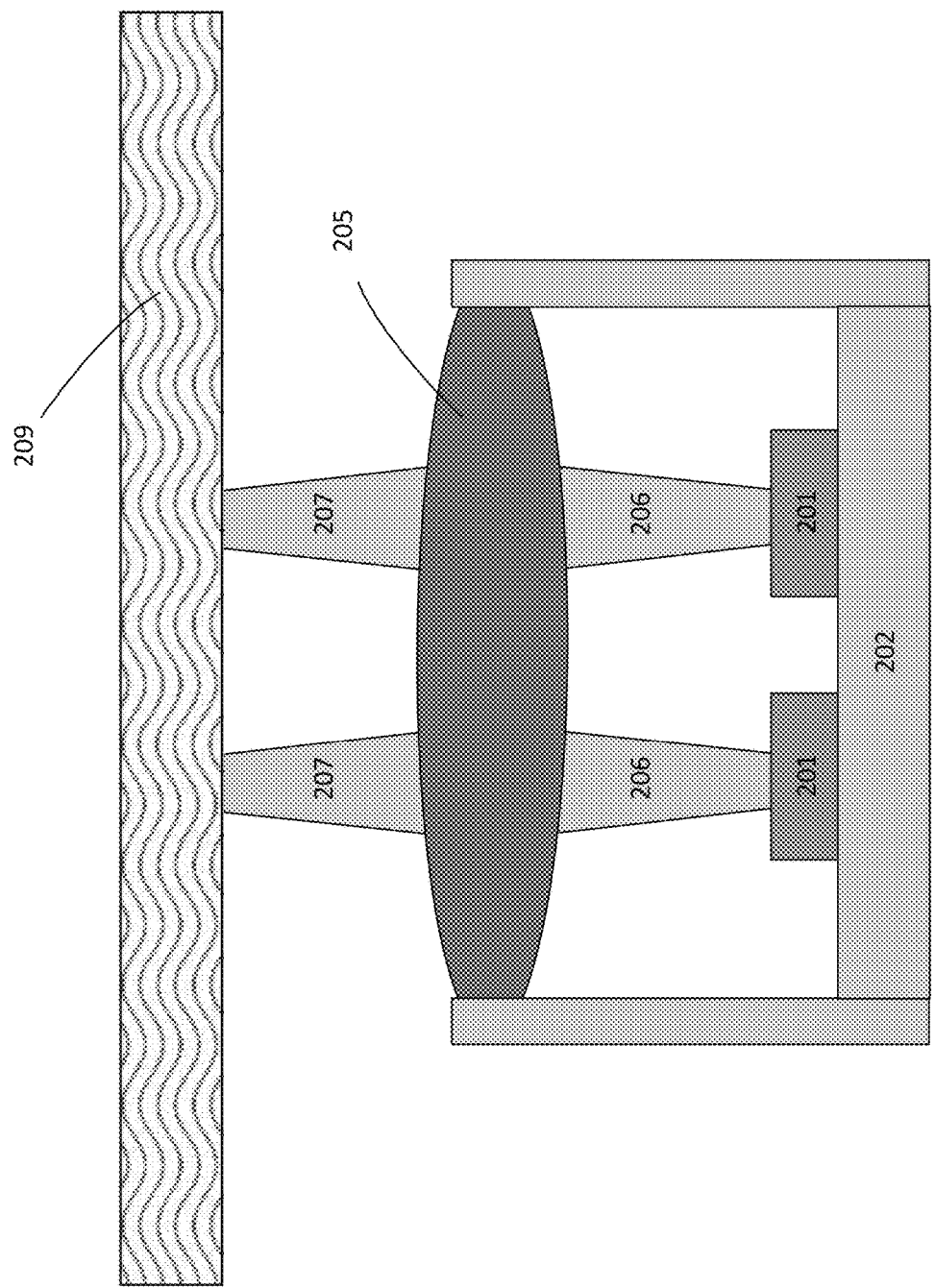
FIG. 2 depicts a cross-sectional view showing operation of an illustrative arrangement of light sources and an imaging lens, according to some embodiments.

FIG. 2 depicts a cross-sectional view showing operation of an illustrative arrangement of light sources and an imaging lens, according to some embodiments. A portion of a stereolithographic device 200 is shown in FIG. 2, and includes light sources 201 arranged on a moveable stage 202, and a lens 205 arranged to direct light from the light sources 201 onto a liquid photopolymer 209. It will be appreciated that the liquid photopolymer may be held in a suitable container in device 200, but this component is not shown in FIG. 2 for purposes of clarity.

According to some embodiments, light sources 201 may include one or more LEDs (e.g., one or more LED arrays as shown in FIG. 1A), which are lambertian light sources. In such a light source, the beams from the light source tend to diverge, as illustrated by the diverging radiation 206 which diverges from respective light sources 201 in FIG. 2. The further the target of radiation is from the LED, the more the radiation is likely to diverge before it reaches the target. Moving the LED away from the target may therefore result in an increase in spot size, which may decrease accuracy of the light source and the intensity of the light source, which may impact the ability of an LED to cure the resin accurately and within the timeframe required. To mitigate this issue, in some embodiments, an imaging lens 205 may counteract this divergence in radiation by imaging the LED radiation 207 onto a liquid photopolymer (e.g., liquid photopolymer resin) 209.

According to some embodiments, imaging lens 205 may refocus diverged radiation to decrease the spot size and/or may increase the intensity of the light produced by the light sources 201. In effect, the accuracy of radiation from light sources 201 may be reconstructed by an imaging lens 205. Additionally, light sources 201 may collectively radiate a larger area of a liquid photopolymer by using multiple light beams instead of being limited to a single beam. These light beams or emitters may vary in beam size, and the radiated area may be adjusted by varying one or more of: the size of the light sources, the number of light sources per array and/or the number of light sources.

Figure 3A:
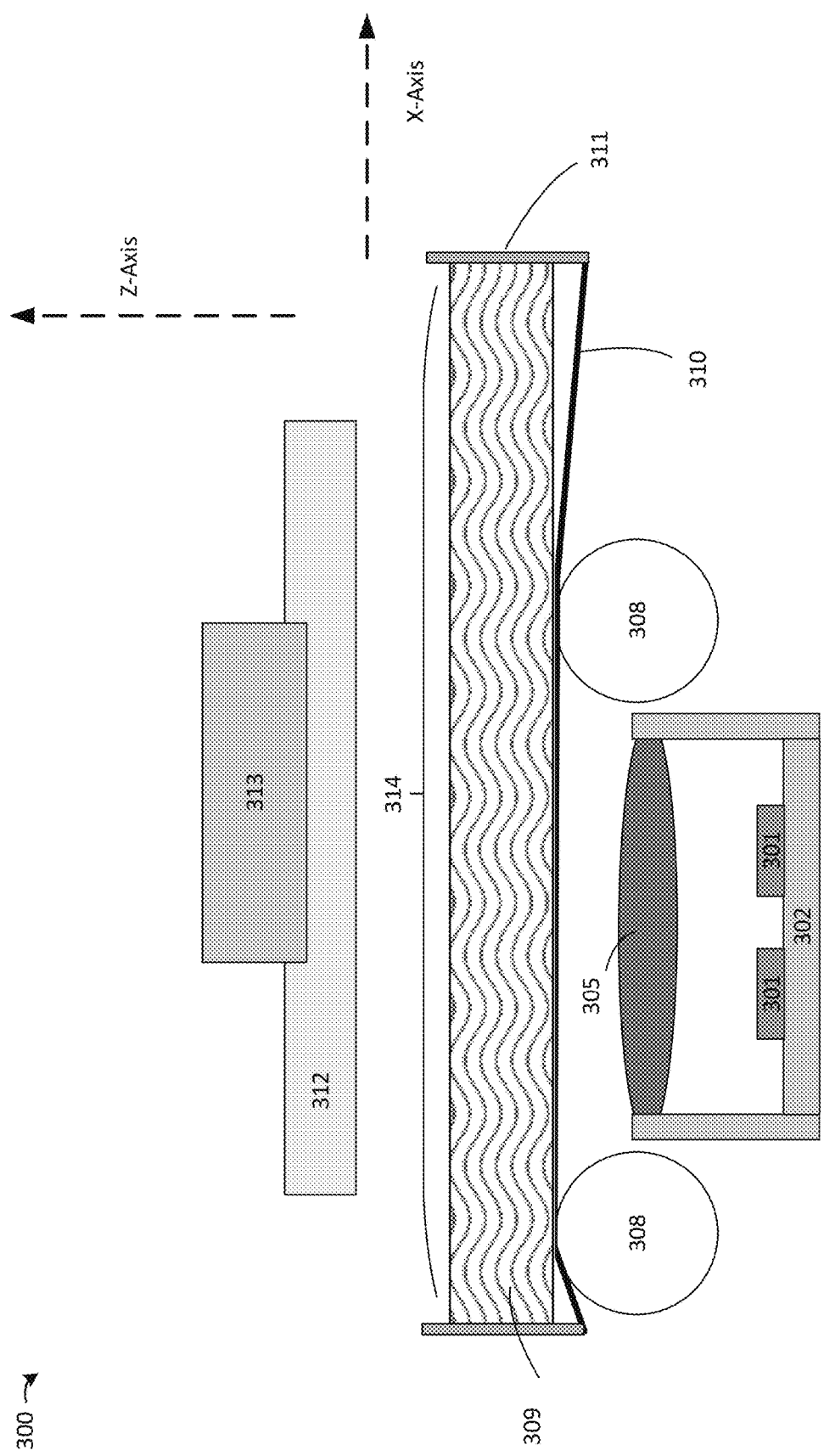
FIGS. 3A-B provide schematic views of a stereolithographic additive fabrication device, according to some embodiments.

An illustrative embodiment of an inverse stereolithographic printer comprising a moveable stage comprising light sources is depicted in FIG. 3A. In the example of FIG. 3A, stereolithographic printer 300 comprises build platform 312, support structure 313, liquid photopolymer 309, supports 311, rollers 308, imaging lens 305, LED arrays 301, and frame 302. The build platform 312 upon which a part is formed, is attached to a support structure 313 which is configured to move the build platform 312 relative to the liquid photopolymer 309 along the Z-axis. The liquid photopolymer 309 rests on top of film 310 and between supports 311 forming an area that can be referred to as the vat 314. In some embodiments, portions of the film 310 may be transparent to actinic radiation, such that actinic radiation can be targeted at portions of the liquid photopolymer 309 through the film 310. The frame 302 may support and move LED arrays 301 within the printer, and an imaging lens 305 may focus the radiation from the LED arrays.

In some embodiments, a part may be formed layer wise onto the build platform 312 by the repetition of a sequence of steps in the building process. In the illustrative process shown, the build platform 312 may be lowered into the vat along the Z-axis. In some cases, the downward motion of the build platform 312 may tend to push liquid photopolymer 309 towards the bottom of the vat 314. This fluid motion may exert force against the bottom of the vat, causing a distorted region to form, wherein the film 310 may no longer be relatively flat. This distorted region, discussed further below, represents an area with greater-than-desired thickness of liquid photopolymer 309. Proceeding with curing of the photopolymer in this region may therefore result in layers of inconsistent thickness, potentially leading to unwanted distortion in the part and/or failure in part formation.

Figure 4:
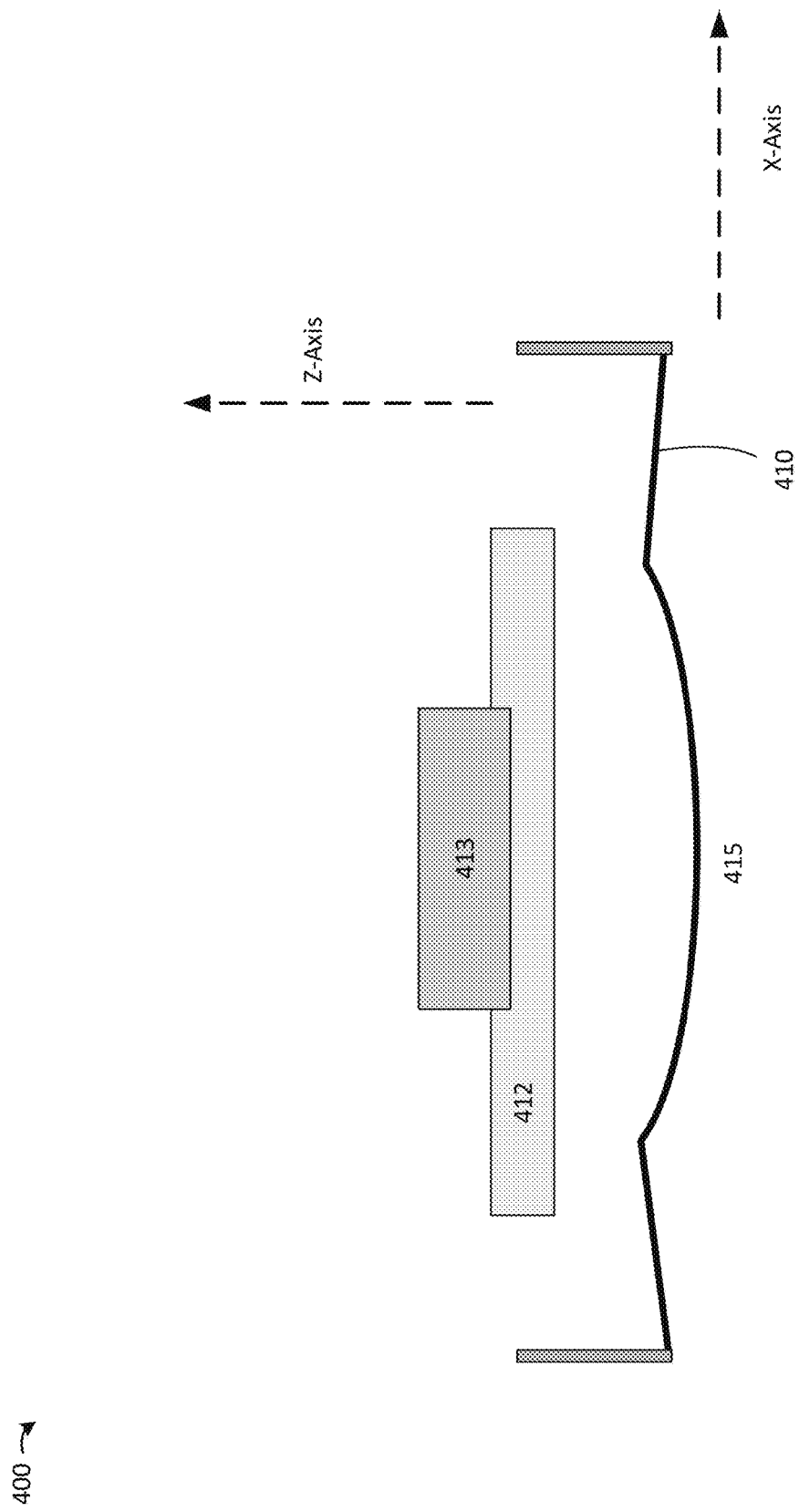
FIG. 4 illustrates distortions in a surface of a container that may occur during operation of an illustrative stereolithographic additive fabrication device, according to some embodiments.

For instance, FIG. 4 depicts an exaggerated illustration of a distorted region within a film, according to some embodiments. A portion of a stereolithographic printer 400 is shown, in which a film 410 includes a distorted region 415. A build platform 412 and support structure 413 are shown for context.

Conventional systems may address a distortion in the film by utilizing a wiper as a levelling element. In such systems, a wiper may move along the X-axis through the area of the distortion. This interaction with the film 310 may result in the formation of a substantially flattened interface region in the area trailing the levelling element as it moves through the area previously occupied by the distortion. However, it may be necessary to wait until the wiper has travelled across the entire length of the film 310 and reversed back to its original position before exposing material to radiation. This delay between the interaction of the wiper and film 310 and the radiation may result in the formation of new distortions of the film during the interval.

Figure 3B:
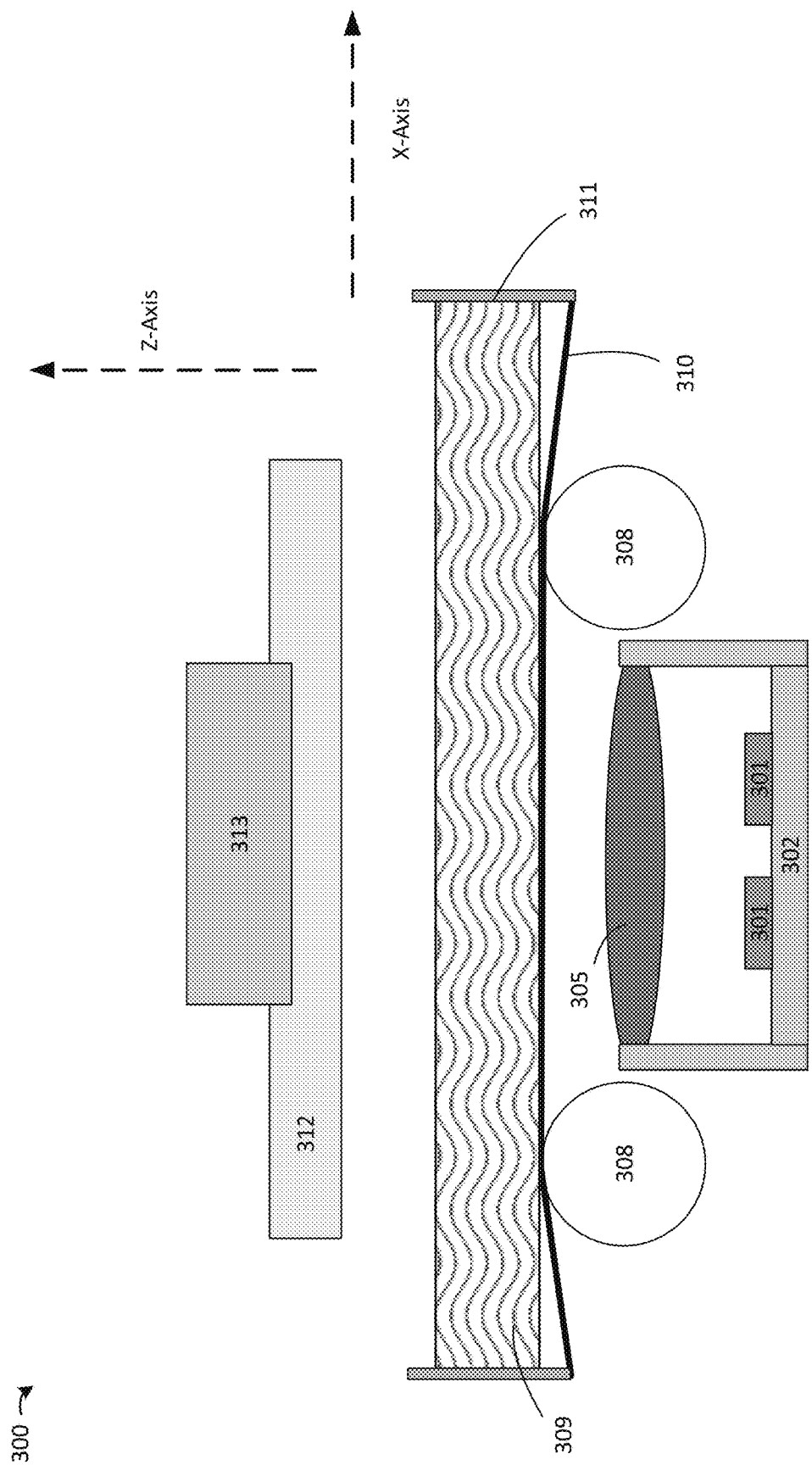

In some embodiments, these issues and others may be addressed by the use of rollers 308 as leveling elements to limit this lag. Rollers 308 may keep the portion of the film 310 directly above the light sources 301 taut and thus relatively flat. This is illustrated in FIG. 3A where only the portion of the film 310 between the rollers 308 are relatively flat, whereas the other areas of the film 310 are comparatively loose. When rollers 308 shift, so does the portion of the film 310 that is taut, as shown in FIG. 3B, which illustrates system 300 with the rollers and moveable stage in a different position along the X-axis compared with FIG. 3A. The rollers 308, directly below a film 310, may exert an upward force which may counteract the downward force of the build platform 312 and liquid photopolymer 309.

According to some embodiments, rollers 308 may be coupled to the moveable stage 302 either directly or via one or more other mechanical elements. In some embodiments, the rollers 308 and the movable stage may be mounted on, or otherwise coupled to, a common element, such as a housing, which is configured to move in the X-axis direction, thereby carrying the moveable stage and rollers with the motion.

Moving light sources 301 with the rollers 308 may advantageously reduce the amount of time between positioning by the rollers and exposure to radiation from the light source, thus reducing any potential distortion in that time interval. An added advantage to this concerted movement of levelling element and light source is that the film 310 that is not directly above the rollers 308 and the area between the rollers 308 may loosen and gradually "peel" any portion of the part that has been printed away from it. This approach causes the film 310 to have a curved surface relative to the region of contact between the solid material and supporting liquid photopolymer 309. The curved surface of the film 310 may allow for a gradual and/or even application of force that aids in minimizing forces applied to the part to remove the adhesion between the part and the surface of the container 311. This passive peel employing the bending of the film 310 may help decrease the adhesive forces between the solid printed material and the supporting photopolymer liquid immediately after formation of the solid material. This decrease in adhesive forces may serve several advantages, including allowing a weaker force to be used in raising the build platform 312.

Moreover, rollers may possess a number of potential advantages compared with static protrusions, including both a minimal profile for the contact area between the element and the film and the ability to "roll," rather than slide, in response to any frictional forces exerted by the film. In some cases, however, rollers may be disfavored overall because of the demand for small tolerances so that flat surfaces are consistently produced at the same height. Such exacting tolerances may be difficult and expensive to meet in practice. The inventors have, however, recognized and appreciated a roller element design that can produce a sufficiently flat film surface without it being necessary for each component of the roller elements to individually be produced at such small tolerances. In particular, a roller may be formed from a number of roller segments arranged along a common axis. The roller segments may be coupled to one another and/or may be held within a suitable structure that allows independent rotation of each roller segment.

Figure 3C:
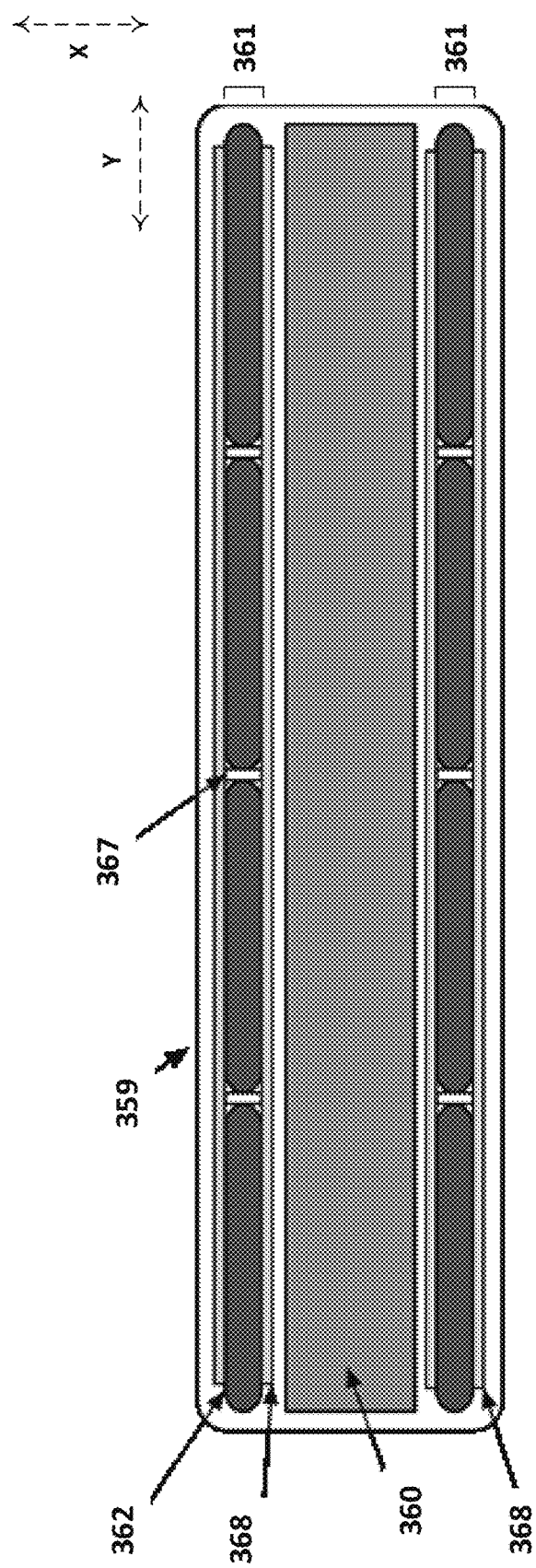
FIGS. 3C-D depict an illustrative moveable stage that includes segmented rollers, according to some embodiments.
Figure 3D:
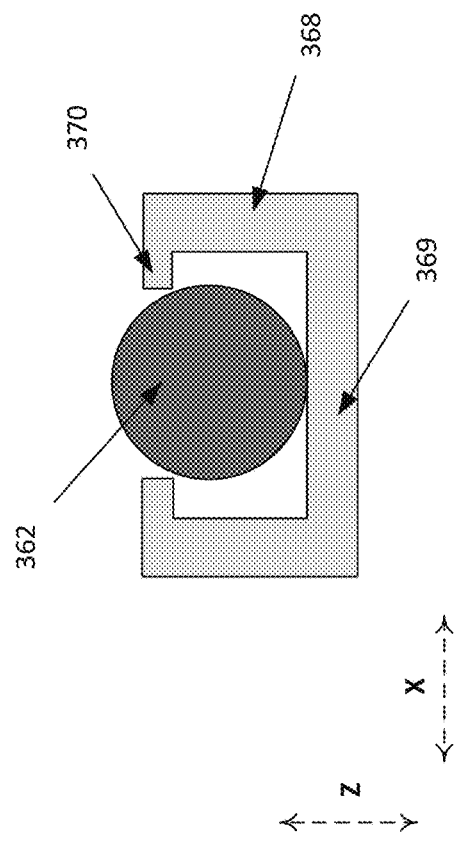

As one example, FIGS. 3C-3D depict an illustrative moveable stage that includes segmented rollers, according to some embodiments. In the example of moveable stage 359 shown in FIG. 3C, each of the two pictured roller elements 361 comprise four roller segments 362. Moveable stage 359 may be included, for instance, as the moveable stage depicted in stereolithographic printer 300 of FIGS. 3A-3B (e.g., the stage comprising elements 301, 302, 305 and 308) such that the roller segments 362 extend along the Y axis of the device 300, perpendicular to both the X-Axis and Z-Axis.

In the example of FIGS. 3C-3D, roller segments 362 may each be formed from any suitable material or materials, but may preferably comprise comparatively incompressible and wear resistant materials, such as aluminum, stainless steel (e.g., 303 grade stainless steel), chrome steel, and/or other grades of steel commonly used for bearings. In some embodiments, roller segments 362 may be treated with one or more coating materials, such as one or more ceramics, titanium nitride, chrome, or combinations thereof. In some implementations, roller segments 362 may include bearing steel rods of approximately 3-10 mm, with each rod having a length of between 20 mm and 60 mm. In some implementations, the moveable stage 359 may include four roller segments within each roller element, with the segments having individual lengths of 45 mm and a diameter of 6.35 mm. Although shown to be of equal lengths in the example of FIGS. 3C-3D, the lengths of the roller segments may in general differ from one another. It will be appreciated that the use of four roller segments in the illustrative roller elements is provided as one example, and any number of roller segments 362 may in general be arranged within each roller element 361.

In the example of FIG. 3C, spacers 367 are provided to maintain a predefined separation distance between roller segments 362, which may act to prevent wear and other contact interactions between roller segments 362. In some embodiments, such spacers may be flexible couplings, such as silicone adhesive connecting roller segments 362. In some embodiments, spacers 367 may include an independently movable element, such as a ball bearing.

As shown in the example of FIG. 3D, a roller segment 362 may be disposed within a retaining feature 368. According to some embodiments, the roller segment may be attached to the retaining feature or to some other part of the moveable stage 359, or may be held in the retaining feature without attachment. Retaining features 368 may act to limit the range of motion of roller segments 362. In particular, as shown in the example of FIG. 3D, the retaining feature 368 may include overhangs or "fingers" 370, which may limit the lateral and/or upward range of motion of the roller segment 362. The retaining feature 368 may further include a supporting base portion 369 that limits the downwards range of motion of the roller segment.

In some embodiments, retaining features 368 may comprise a low-friction and/or wear-resistant material, such as nylon, polyacetal, polytetrafluoroethylene (PTFE), ultra-high-molecular-weight polyethylene (UHMWPE), and/or PEEK, allowing the roller segment 362 to move against the fingers 370 and supporting base 369. It should be noted, however, that it is not necessary for the roller segments 362 to actually roll continually or at all during operation, though such rolling may reduce the lateral forces exerted against a film. In general, the inventors have found that a small amount of clearance between the retaining features 368 and roller segments 362 to be advantageous. In particular, a clearance between the retaining features 368 and roller segments 362 may be between 10 µm and 50 µm, or between 20 µm and 40 or less than 50 µm.

In some embodiments, the roller segments 362 may have less than 200 µm of clearance to move in the Z axis against the fingers 370 of the retaining features 368 and less than 50 µm of clearance to move in the X axis against the sides of the retaining features 368. In some embodiments, roller segments 362 may be constrained from motion away from the supporting base 369 by the tension of a film in contact with the roller segment 362.

In some embodiments, fingers 370 may extend over the roller segment 362 a sufficient amount to restrict the motion of the roller segment. In addition, or alternatively, ends of roller segments 362 may be shaped in various ways to minimize unwanted interactions between segments adjacent to one another along the Y axis. In some embodiments, a cylindrical spacing region may be formed at the ends of each roller segment, the spacing regions having a diameter smaller than the diameter of the non-spacing regions of the roller. In some embodiments, a narrowed positive feature formed by such a narrowed cylindrical segment may be paired with a negative feature in the abutting roller formed by a cylindrical recess, thus partially interlocking the roller segments 362. The sides of the roller segments 362 may further incorporate chamfers or other features, but are preferably polished so as to avoid sharp edges that may increase wear against the film 103.

The inventors have recognized and appreciated that roller segments 362 allow for the roller segments to have significantly larger dimensional tolerances, such as straightness or average diameter, compared with the tolerances usually necessary for a roller element to produce a desired film flatness. As discussed above, a roller elements generally demand small tolerances so that flat surfaces are consistently produced at the same height. A roller element comprising roller segments may, however, produce a consistently flat film surface even though a consistently flat film surface would not result if the same cylindrical material were used as a single piece roller element.

For instance, small deviations in straightness, such as a bend, in a single long roller may result in a significant displacement of the surface of the roller from the midline at the midpoint of the roller. The same degree of deviation in straightness, however, in a shorter length of roller, may result in a much smaller total displacement in the surface of the roller from the midline of at the midpoint of the shorter roller. Accordingly, the use of multiple, and thus shorter, roller segments 362, allows for smaller total displacements, even with the same tolerances in straightness. A much wider range of tolerances may therefore be acceptable in the roller segments 362. In other words, the dimensional tolerance of the retaining features, particularly with regards to the supporting base 369, may be the primary influence on the precision and accuracy of the motion of the roller segments, rather than the dimension tolerances of the roller segments themselves. The provision of a uniformly flat and level supporting base 369 (with respect to the XY build plane), however, may be considerably easier and less expensive.

As an alternative to the depicted segmented cylindrical roller segments 362, in some embodiments, one or more different segment structures may be combined to form a roller segment. For instance, circular ball bearings and/or flexible rods may be arranged in place of the illustrative cylindrical roller segments. Conceptually, a sufficiently flexible rod may decouple the deflection and/or deviation at a given portion of the rod from more distant points on the rod. In some embodiments, an otherwise inflexible rod may be modified by the addition of circular cuts spaced along the length of the rod. As one example, a relatively inflexible rod having a diameter of 6.35 mm and length of 200 mm may be modified by making radial cuts, or trenches, of approximately 2 mm into the rod spaced 40 mm apart along the length of the rod. The remaining core of the rod, having a diameter of 2.35 mm, may be comparatively more flexible than the full width rod and allows for a form of segmentation, whereby unmodified regions of the rod located between trenches are capable of a decoupling deflection at the regions thinned by trenches.

In some embodiments, roller segments 362 may be supported and/or interconnected along a common axis. As one example, roller segments 362 may include a cylindrical hole running lengthwise through the segments 362 and a mounting device, such as a thin rod or flexible wire, may run through a group of segments 362 through such a cylindrical hole. Alternatively, or additionally, roller segments 362 may include a series of protrusions and depressions on abutting ends, such that a protruding portion of a first roller segment 362 may extend partially into a depressed portion of an adjacent roller segment 362.

In the example of FIG. 3C, moveable stage 359 further comprises one or more light sources forming exposure source 360 located between roller elements 362. The exposure source 360 may be configured as a linear array of light emitting elements, such as the LED arrays described above.

While some embodiments described herein employ rollers as leveling elements, it should be appreciated that rollers are described as but one example of a leveling element, and that any other structure or geometry that serves the purpose of leveling the film 310 may be used in place of any one or more of the rollers. As such, it will be appreciated that, for any embodiments described herein that includes one or more rollers, any other suitable leveling element may be substituted for any one or more of the rollers, as the techniques described herein are not limited to any particular type of leveling element.

Figure 5A:
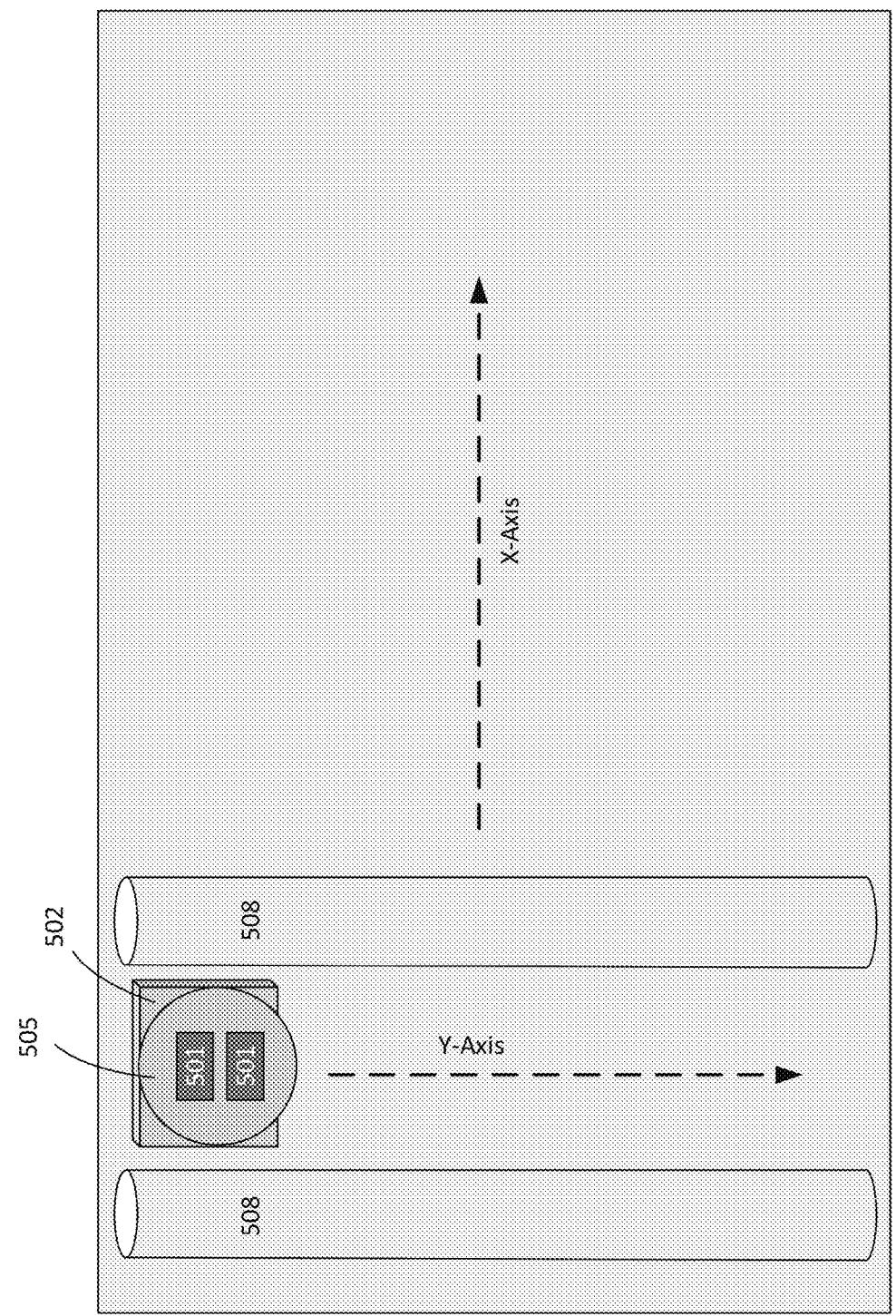
FIGS. 5A-C illustrate motion of an LED array coupled to rollers, according to some embodiments.
Figure 5B:
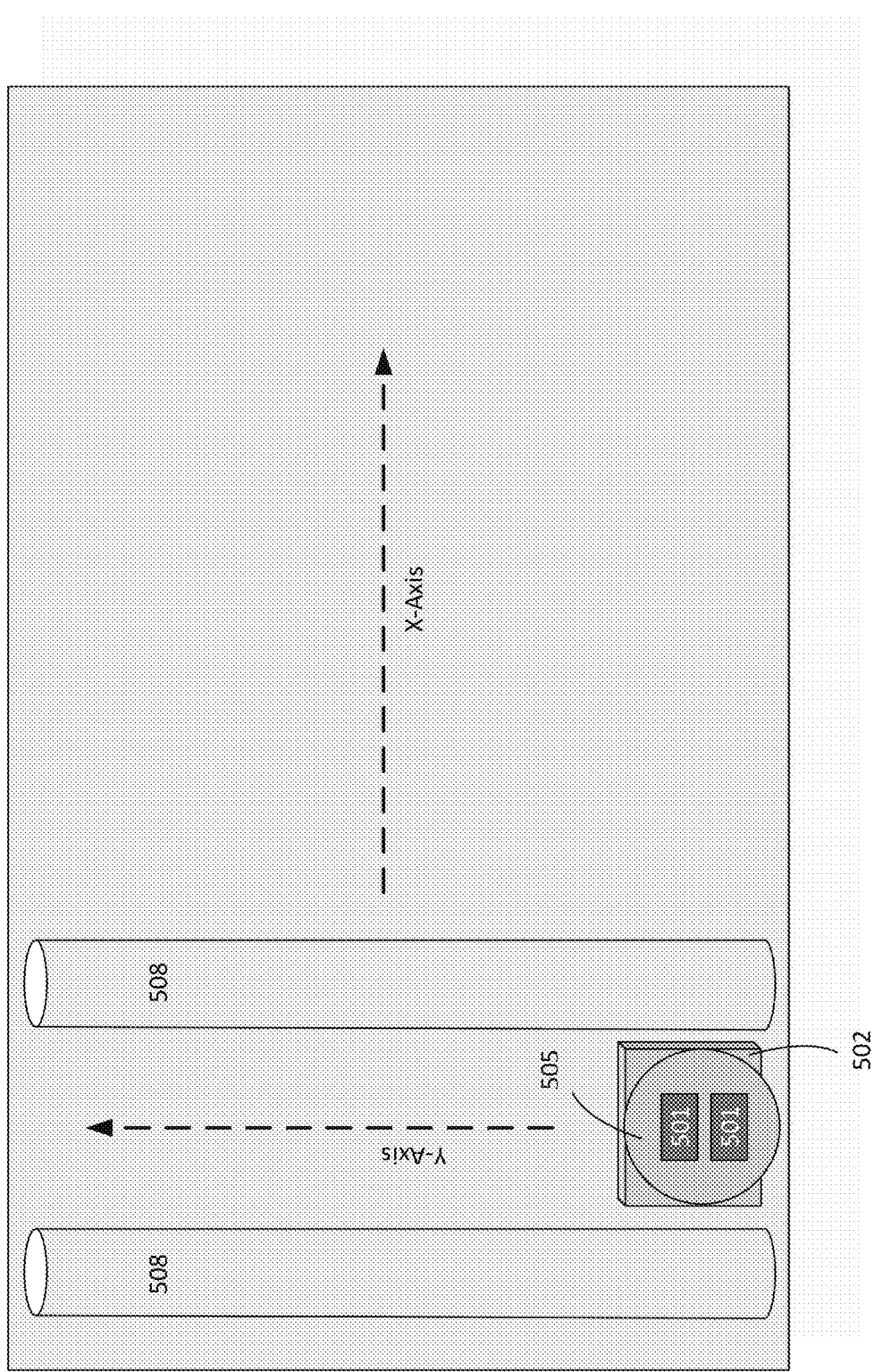
Figure 5C:
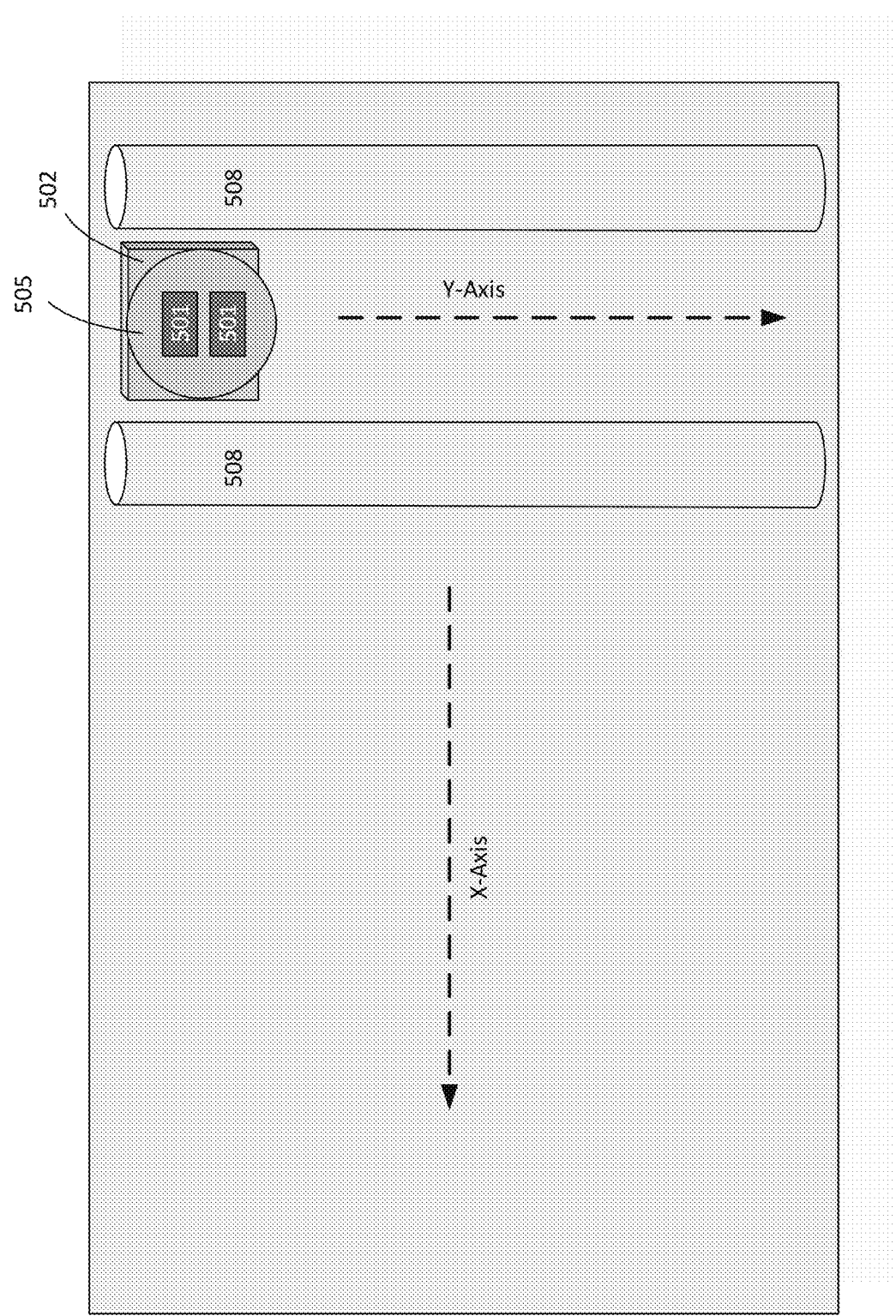

Leveling elements (e.g., rollers) may be configured in various ways, an example of which is illustrated in FIGS. 5A-5C, which depict two straight parallel rollers. In some embodiments, cylinders are advantageous because they are easy to move by rolling and/or sliding. Though other shapes and structures may also be capable of such movements, cylinders, or near cylinders, may have several advantages. For example, cylinders or near cylinders may experience less opposing friction than rollers with a sharp edge, such as rectangular prisms. Cylinders or near cylinders may also maintain the integrity of the film by not leaving imprints or scratches from the sharp edges. Structures and shapes with additional faces approaching a cylindrical shape may provide advantages as leveling elements such as ensuring a strict tolerance. In some embodiments, a coating or film can also be included to further limit friction. The coating or film can be applied to a surface of the leveling elements to reduce friction.

In some embodiments, the use of LED arrays and roller members, such as described above, may be combined. In such embodiments, the light source may be configured to move with the rollers. As one example, the arrays may move with the rollers in the Y-direction, as shown in FIGS. 5A-5C. In the example of FIG. 5C, rollers 508 are arranged with a moveable stage 502 in between on which two light sources 501 (e.g., LED arrays) are arranged beneath a lens 505. It will be appreciated that additional components to produce motion of the rollers and moveable stage may also be included but are not shown in FIGS. 5A-5C for clarity.

In some cases, multiple arrays of light sources may be arranged onto different moveable stages that may be independently moved and operated to produce light. The inventors have appreciated that having multiple options for scalability by adding additional arrays or modifying the array to have multiple emitter sizes or alternative LED arrangements may allow for additional flexibility or a more linear increase in cost/increased output as compared to adding an entirely new laser in an additive fabrication device that employs a laser light source or a new projector in an additive fabrication device that employs a DLP projector.

Figure 6A:
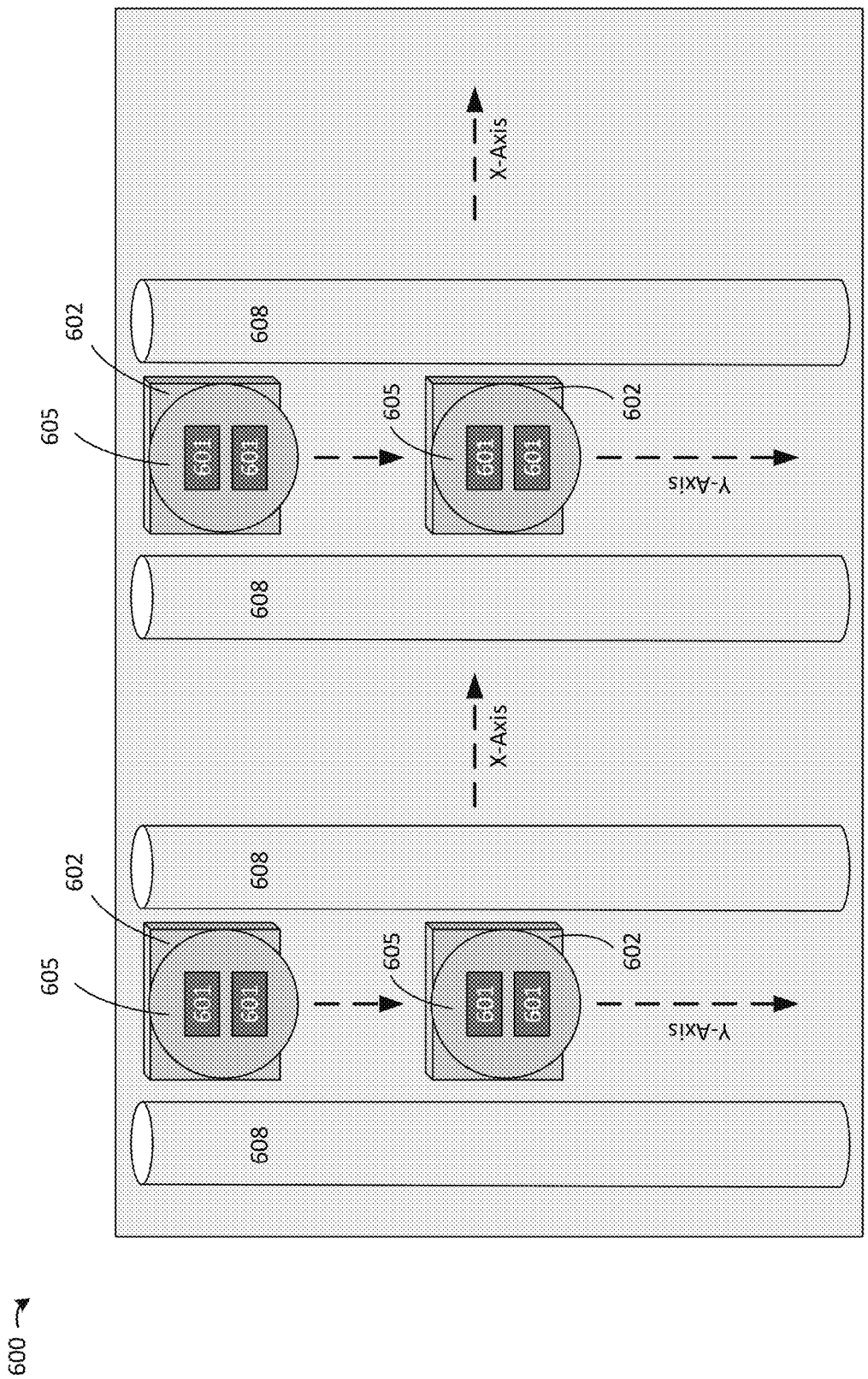
FIGS. 6A-C illustrate motion of multiple LED arrays coupled to rollers, according to some embodiments.
Figure 6B:
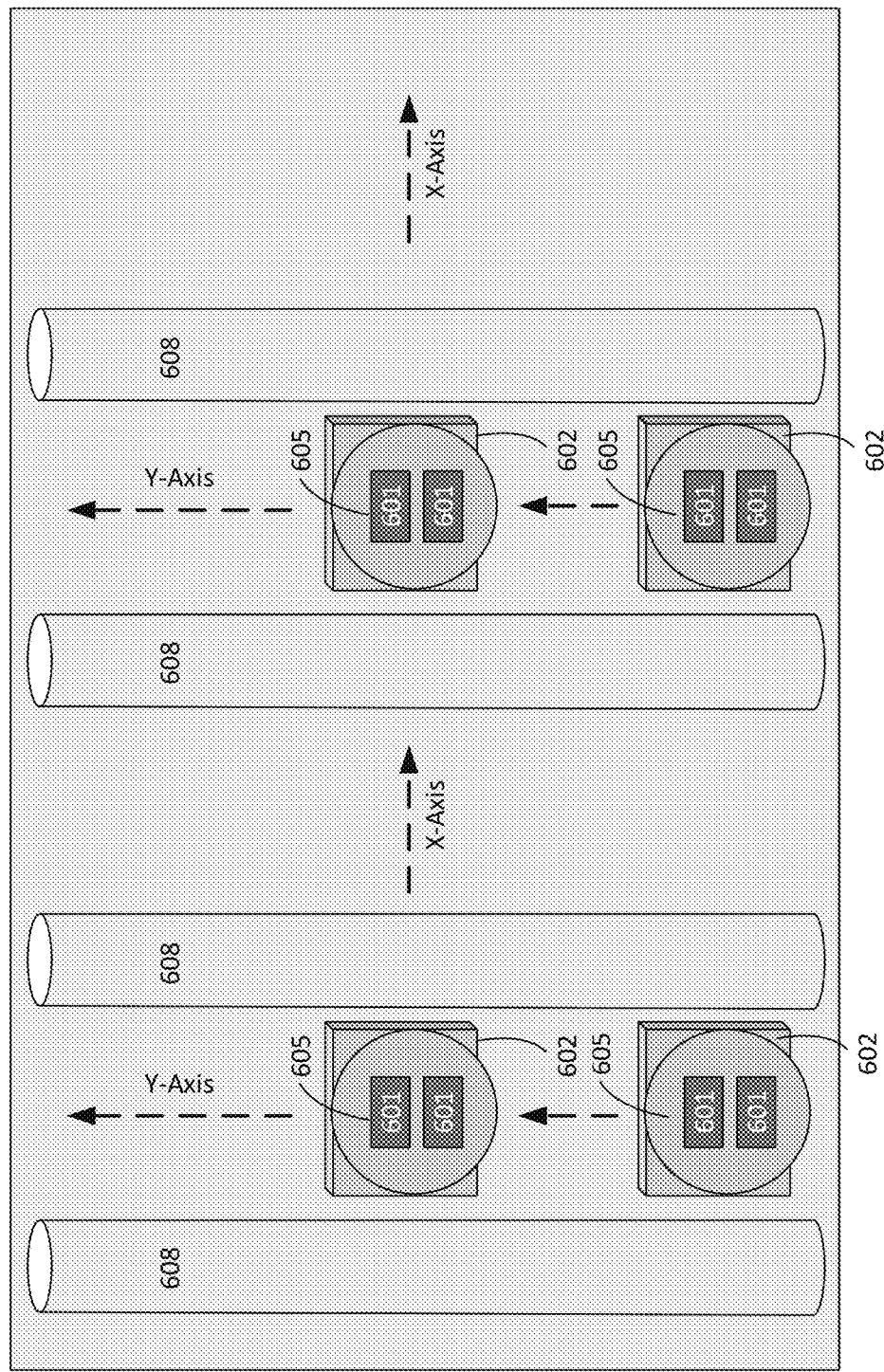
Figure 6C:
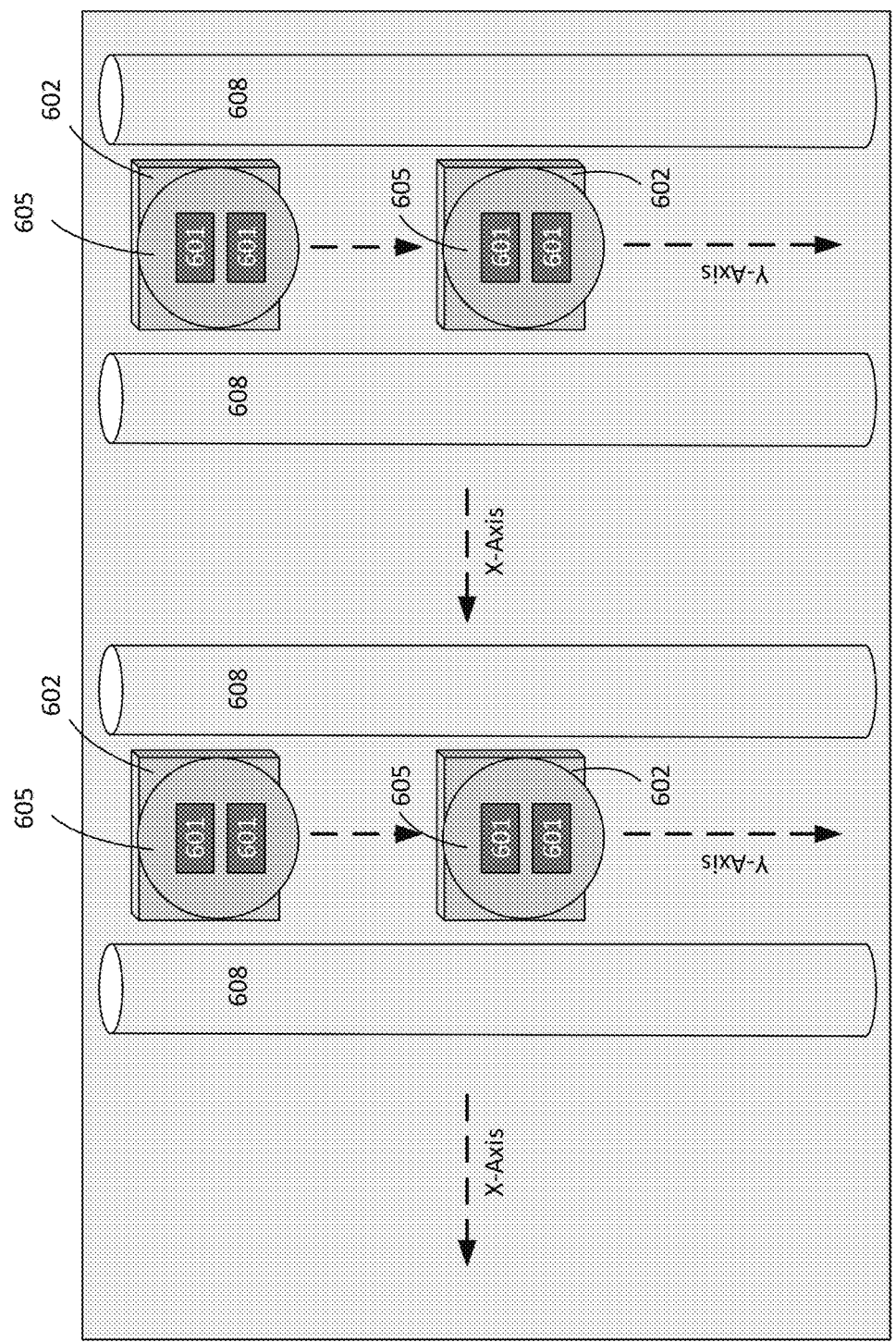

An illustrative embodiment of motion of multiple LED arrays coupled to multiple sets of rollers is depicted in FIGS. 6A-C. FIG. 6A depicts four sets of light sources (e.g., four pairs of LED arrays) 601 which can all move along both the X-axis and the Y-axis. FIG. 6B illustrates the four sets of light sources after movement along the Y-axis and FIG. 6C illustrates movement along the X-axis. By including multiple sets of rollers with multiple LED arrays coupled to the rollers, the efficiency with which a part is fabricated may significantly improve over that of conventional systems. For example, multiple portions of a build volume can be simultaneously exposed to a light source. This may significantly decrease the time to fabricate a part.

Figure 7:
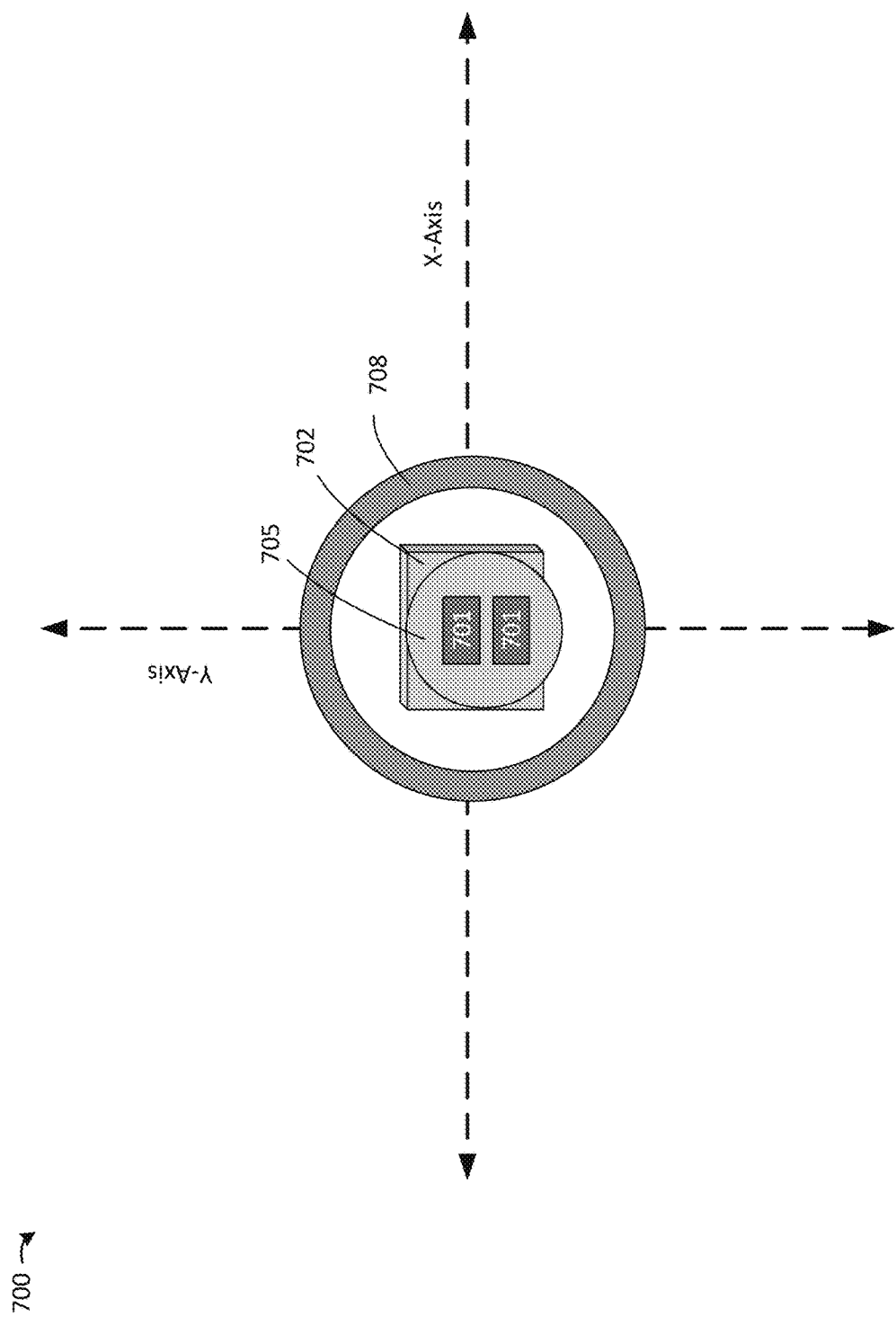
FIG. 7 illustrates a light source with a roller in a ring geometry, according to some embodiments.

FIG. 7 illustrates an embodiment with a roller in a ring geometry, according to some embodiments. System 700 includes light sources 701 arranged on a moveable stage 702 beneath a lens 705. A ring-shaped roller 708 is arranged around the moveable stage and may be configured to move in both the X-axis and Y-axis directions along with the moveable stage. A roller in a ring geometry may have more degrees of freedom than rollers in a straight line geometry. In some embodiments, the additive fabrication device may include a plurality of rollers of a ring geometry. The plurality of rollers may move simultaneously across a build area of the additive fabrication device. Rollers of a ring geometry may further move in different directions and may expedite the printing process even further.

FIG. 8 illustrates a stereolithographic printer 800 that includes a cooling fan beneath the light sources. In the example of FIG. 8, light sources 801 (e.g., LED arrays) are arranged on moveable stage 802 beneath a lens 805 and are configured to move beneath the container formed by film 810 and walls 811 along with the rollers 808. The container holds liquid photopolymer 809 and the printer is configured to form parts on the build platform 812, supported by support structure 813.

In the example of FIG. 8, a heat sink 817 and cooling fan 816 are arranged beneath the light sources 801. Since some light sources, such as LEDs, radiate via an exothermic reaction, a heat sink and/or a cooling fan can absorb the heat produced and help to control the temperature of the additive fabrication device in general and the LED array in particular. This may allow a longer lifetime of LED arrays and/or additive fabrication devices.

Figure 10:
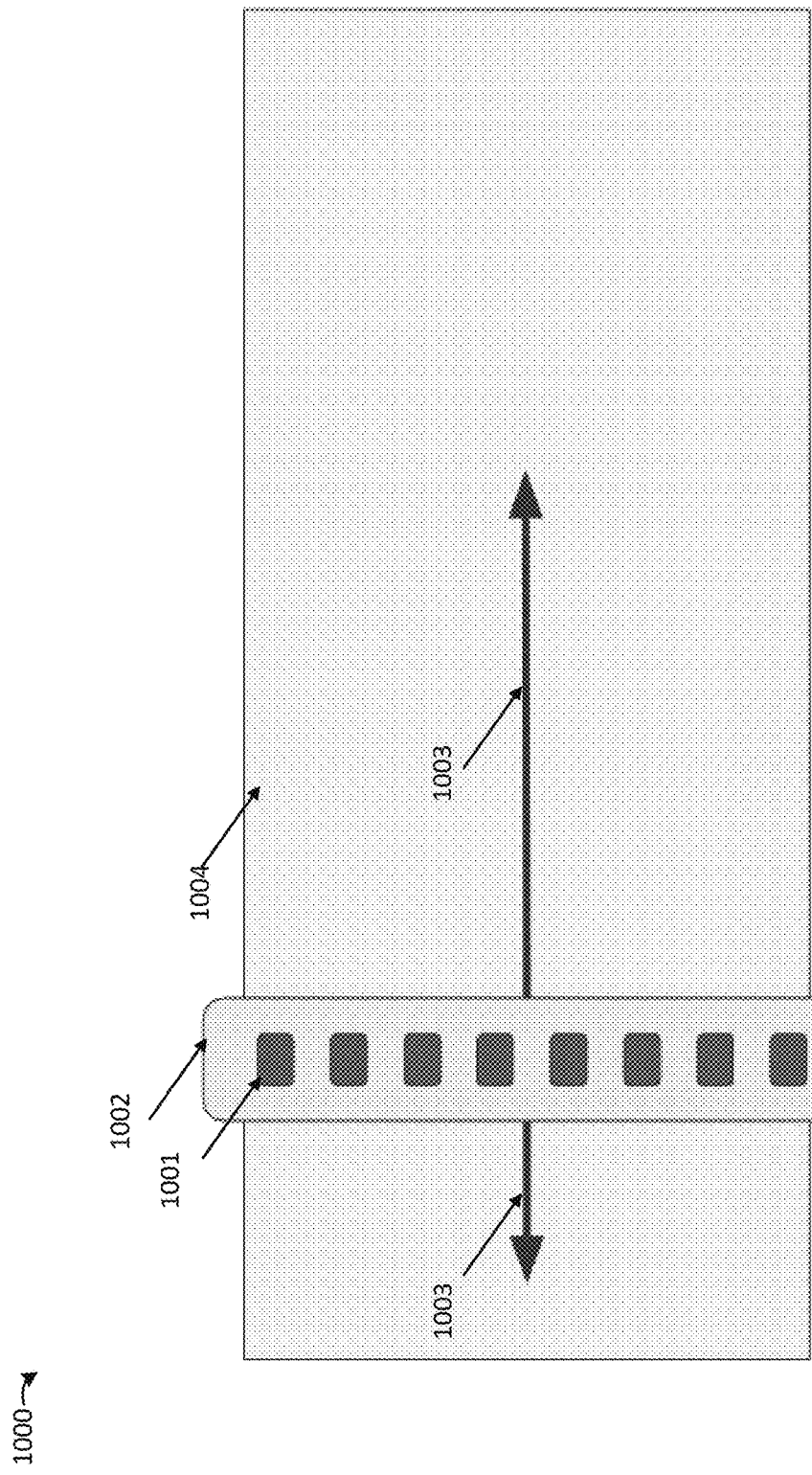
FIG. 10 illustrates a linear LED array extending across a build area and configured to move along an axis, according to some embodiments.

While a moveable stage may extend over any suitable portion of a build area, FIG. 10 illustrates one embodiment wherein LED arrays 1001 are configured to extend across one full dimension of the build area 1004. That is, the LED arrays (or at least the moveable stage on which the LED arrays are arranged) extends completely over one dimension of the build area, such as the width, and may in some cases extend further. This arrangement of light sources is referred to herein as a Linear LED Array. In the example of FIG. 10, the LED arrays 1001 (which may each, for instance, be one of the LED arrays 101 shown in FIG. 1A) are depicted with space between then along the moveable stage. However, in some embodiments the LED arrays may be lined up end to end to effectively produce a single large array of LEDs.

Figure 11:
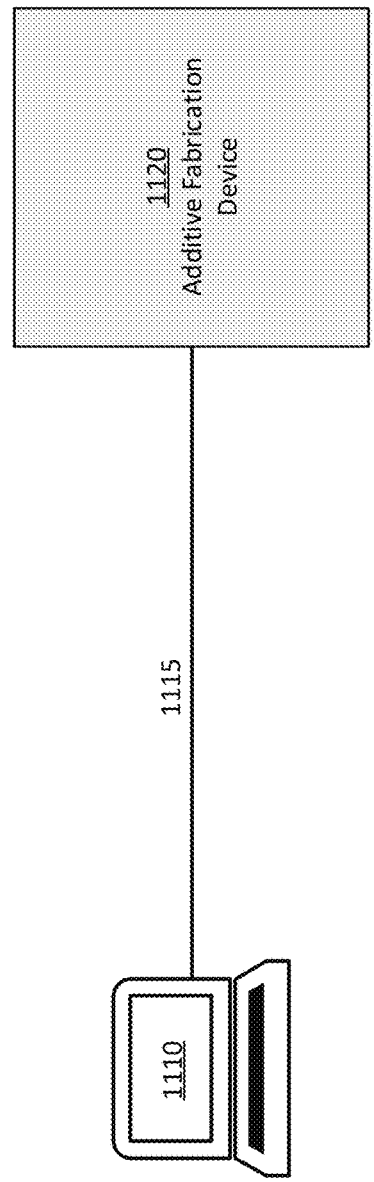
FIG. 11 is a block diagram of a system suitable for practicing aspects of the invention, according to some embodiments.

In the example of FIG. 10, the Linear LED array 1001 is aligned along one axis such that the movement of the Linear LED array 1001 coupled with a moveable stage 1002 is limited to one axis 1003. As may be appreciated by one skilled in the art, it may be advantageous to move the stage along a single axis, in this case the x-axis. As may be further appreciated the Linear LED array could be comprised of one continuous LED array, or multiple smaller LED arrays arranged together. The LED arrays could be made up of one row of LEDs, or multiple rows of LEDs arranged in a line or in a staggered configuration. This arrangement may be coupled with any other configurations described herein including the use of multiple Linear LED Arrays FIG. 11 is a block diagram of a system suitable for practicing aspects of the invention, according to some embodiments. System 1100 illustrates a system suitable for generating instructions to perform additive fabrication by an additive fabrication device and subsequent operation of the additive fabrication device to fabricate an object. For instance, instructions to activate or deactivate light sources, move a moveable stage, etc. as described by the various techniques above may be generated by the system and provided to the additive fabrication device. Various parameters associated with operation of a moveable stage may be stored by system computer system 1110 and accessed when generating instructions for the additive fabrication device 1120 to fabricate a part.

According to some embodiments, computer system 1110 may execute software that generates two-dimensional layers that may each comprise sections of an object. Instructions may then be generated from this layer data to be provided to an additive fabrication device, such as additive fabrication device 1120, that, when executed by the device, fabricates the layers and thereby fabricates the object. Such instructions may be communicated via link 1115, which may comprise any suitable wired and/or wireless communications connection. In some embodiments, a single housing holds the computing device 1110 and additive fabrication device 1120 such that the link 1115 is an internal link connecting two modules within the housing of system 1100.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Figure 12:
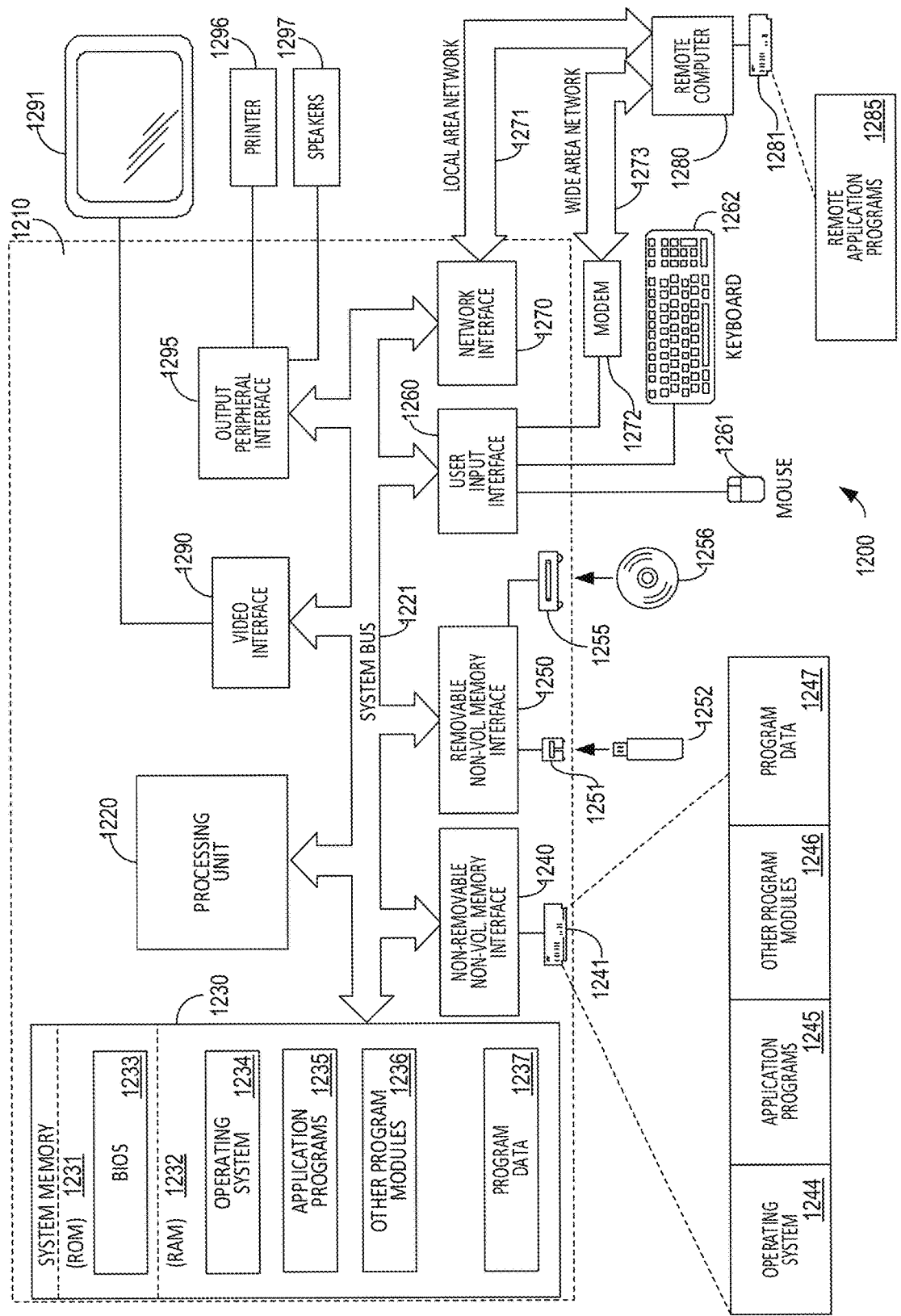
FIG. 12 illustrates an example of a computing system environment on which aspects of the invention may be implemented.

FIG. 12 illustrates an example of a suitable computing system environment 1200 on which the technology described herein may be implemented. For example, computing environment 1200 may form some or all of the computer system 1110 shown in FIG. 11. The computing system environment 1200 is only one example of a suitable computing environment and is not intended to suggest any limitation as to the scope of use or functionality of the technology described herein. Neither should the computing environment 1200 be interpreted as having any dependency or requirement relating to any one or combination of components illustrated in the exemplary operating environment 1200.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the technology described herein includes a general purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a flash drive 1251 that reads from or writes to a removable, nonvolatile memory 1252 such as flash memory, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad. Other input devices (not shown) may include a microphone, joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to form layers of solid material on a build platform, each layer of material being formed so as to contact a container in addition to the surface of the build platform and/or a previously formed layer of material, the additive fabrication device comprising:
   a container having an interior bottom surface extending in a first direction and a second direction, perpendicular to the first direction, wherein the interior bottom surface of the container is formed, at least in part, from a suspended film; and
   a movable stage configured to move in the first direction, the movable stage being arranged beneath the container and comprising:
      a plurality of light sources offset from one another along the second direction and operable to direct light through the interior bottom surface of the container; and
      a plurality of leveling elements configured to contact the suspended film while the movable stage moves in the first direction, the plurality of leveling elements including leveling elements arranged on either side of the plurality of light sources along the first direction that apply an upward force on the suspended film to produce a flat region of the suspended film between the leveling elements arranged on either side of the plurality of light sources as the movable stage moves in the first direction.

2. The additive fabrication device of claim 1, wherein the plurality of leveling elements includes one or more rollers.

3. The additive fabrication device of claim 2, wherein the one or more rollers are mechanically coupled to the moveable stage.

4. The additive fabrication device of claim 1, further comprising at least one lens coupled to the moveable stage and arranged between one or more of the plurality of light sources and the container.

5. The additive fabrication device of claim 1, wherein the plurality of light sources comprise a plurality of light sources of a first size and a plurality of light sources of a second size, different from the first size.

6. The additive fabrication device of claim 5, wherein the plurality of light sources of the first size is offset from the plurality of light sources of the second size along the first direction.

7. The additive fabrication device of claim 1, wherein the plurality of light sources comprise:
   a first group of light sources offset from one another along the second direction; and
   a second group of light sources offset from one another along the second direction and offset from the first group of light sources along the first direction.

8. The additive fabrication device of claim 7, wherein each of the light sources of the second group of light sources are offset from all of the light sources of the first group of light sources in both the first and the second direction.

9. The additive fabrication device of claim 1, wherein the movable stage extends over the entire extent of the container along the second direction.

10. The additive fabrication device of claim 1, wherein the plurality of light sources comprise a plurality of LEDs.

11. A method of additive fabrication, the method comprising:
   moving, within an additive fabrication device, a movable stage beneath a container having an interior bottom surface extending in a first direction and a second direction, perpendicular to the first direction, wherein the interior bottom surface of the container is formed, at least in part, from a suspended film, the container holding a liquid photopolymer, and the movable stage configured to move in the first direction, the movable stage being arranged beneath the container and comprising a plurality of light sources offset from one another along the second direction and operable to direct light through the interior bottom surface of the container, and a plurality of leveling elements configured to contact the suspended film while the movable stage moves in the first direction, the plurality of leveling elements including leveling elements arranged on either side of the plurality of light sources along the first direction that apply an upward force on the suspended film to produce a flat region of the suspended film between the leveling elements arranged on either side of the plurality of light sources as the movable stage moves in the first direction; and
   directing actinic radiation from at least some of the plurality of light sources through the flat region of the suspended film to the liquid photopolymer held by the container, thereby forming a layer of solid material that contacts the interior bottom surface in addition to the surface of a build platform and/or to a previously formed layer of material.

12. The method of claim 11, wherein the additive fabrication device comprises at least one lens coupled to the moveable stage, the at least one lens being arranged between one or more of the plurality of light sources and the container.

13. The method of claim 11, wherein the plurality of light sources comprise a plurality of light sources of a first size and a plurality of light sources of a second size, different from the first size.

14. The method of claim 13, wherein the plurality of light sources of the first size is offset from the plurality of light sources of the second size along the first direction.

15. The method of claim 11, wherein the plurality of light sources comprise:
   a first group of light sources offset from one another along the second direction; and
   a second group of light sources offset from one another along the second direction and offset from the first group of light sources along the first direction.

16. The method of claim 15, wherein each of the light sources of the second group of light sources are offset from all of the light sources of the first group of light sources in both the first and the second direction.

17. The method of claim 11, wherein the movable stage extends over the entire extent of the container along the second direction.

18. The method of claim 11, wherein the plurality of light sources comprise a plurality of LEDs.

\* \* \* \* \*